United States Patent
Becker et al.

(10) Patent No.: US 7,171,659 B2
(45) Date of Patent: Jan. 30, 2007

(54) SYSTEM AND METHOD FOR CONFIGURABLE SOFTWARE PROVISIONING

(75) Inventors: Brian Eric Becker, Colorado Springs, CO (US); Michael Robert Hanson, Menlo Park, CA (US); Alain Jules Mayer, San Francisco, CA (US); Michael Todd Schroepfer, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 716 days.

(21) Appl. No.: 10/102,153

(22) Filed: Mar. 19, 2002

(65) Prior Publication Data

US 2003/0195921 A1    Oct. 16, 2003

(51) Int. Cl.
   G06F 9/44    (2006.01)
   G06F 15/16   (2006.01)
(52) U.S. Cl. .................. 717/171; 709/217
(58) Field of Classification Search .......... 717/171, 717/176; 709/219, 247, 226, 223
   See application file for complete search history.

(56) References Cited

U.S. PATENT DOCUMENTS

| | | | |
|---|---|---|---|
| 5,919,247 A | 7/1999 | Van Hoff et al. | 709/217 |
| 6,266,811 B1 | 7/2001 | Nabahi | 717/11 |
| 6,272,536 B1 | 8/2001 | van Hoff et al. | 709/217 |
| 6,272,556 B1 | 8/2001 | Gish | 709/315 |
| 6,282,711 B1 | 8/2001 | Halpern et al. | 717/11 |
| 6,282,712 B1 | 8/2001 | Davis et al. | 717/11 |
| 6,286,041 B1 | 9/2001 | Collins et al. | 709/221 |
| 6,289,511 B1 | 9/2001 | Hübinette | 717/11 |
| 6,301,707 B1 | 10/2001 | Carroll et al. | 717/11 |
| 6,301,708 B1 | 10/2001 | Gazdik et al. | 717/11 |
| 6,314,428 B1 | 11/2001 | Brew et al. | 707/103 |
| 6,324,690 B1 | 11/2001 | Luu | 717/11 |
| 6,327,706 B1 | 12/2001 | Amberg et al. | 717/11 |
| 6,349,408 B1 | 2/2002 | Smith | 717/11 |
| 6,360,246 B1 | 3/2002 | Begley et al. | 709/203 |
| 6,363,291 B2 | 3/2002 | Nagaoka et al. | 700/100 |
| 6,366,916 B1 | 4/2002 | Baer et al. | 707/10 |
| 6,367,075 B1 | 4/2002 | Kruger et al. | 717/11 |
| 6,377,977 B1 | 4/2002 | Sakata | 709/205 |
| 6,381,631 B1 | 4/2002 | van Hoff | 709/202 |
| 6,438,737 B1 * | 8/2002 | Morelli et al. | 716/16 |
| 6,446,071 B1 | 9/2002 | Callaway et al. | 707/10 |

(Continued)

OTHER PUBLICATIONS

Roger Clarke, "A Contingency Approach to the Application Software Generations", ACM SIGMIS Database, vol. 22, Issue 3, Jun. 1991, pp. 23-34.*

(Continued)

Primary Examiner—Wei Zhen
Assistant Examiner—Chih-Ching Chow
(74) Attorney, Agent, or Firm—Osha Liang LLP

(57) ABSTRACT

A system and method for the automated provisioning of software applications onto one or more computers. The provisioning system uses a model of the application, which describes the application in terms of its software features and the actions to manipulate the application. The model preferably describes this information in a general way, such that it is independent of any environmental characteristics associated with the computers. The provisioning system also receives as input a set of references to selected ones of the computers onto which the application is to be provisioned.

31 Claims, 10 Drawing Sheets

U.S. PATENT DOCUMENTS

| | | | |
|---|---|---|---|
| 7,020,697 B1* | 3/2006 | Goodman et al. | 709/223 |
| 2002/0032754 A1* | 3/2002 | Logston et al. | 709/219 |
| 2002/0174266 A1* | 11/2002 | Palem et al. | 709/328 |
| 2002/0194584 A1* | 12/2002 | Suorsa et al. | 717/176 |
| 2003/0018763 A1* | 1/2003 | Doherty et al. | 709/223 |

OTHER PUBLICATIONS

James Gaskin, "Network World Test Alliance", http://www.nwfusion.com/reviews/0906rev.html, Network World, Sep. 6, 1999, 8 pages.

Deni Connor, "Easing software rollouts", http://www.nwfusion.com/newsletters/servers/2001/01086774.html, Network World Servers Newsletter, Nov. 5, 2001, 2 pages.

"Bootstrapping an Infrastructure", http://www.infrastructures.org/papers/bootstrap/Steve Traugott, Sterling Software, NASA Ames Research Center—stevegt@TerraLuna.Org and Joel Huddleston, Level 3 Communications—joelh@TerraLuna.Org, published in the *Proceedings of the Twelfth USENIX Systems Administration Conference* (LISA '98), Boston, Massachusetts—http://www.usenix.org/publications/library/proceedings/lisa98/traugott.html, 25 pages.

"Intelligent Application Management for Data Centers", *Raplix*, www.raplix.com, 18 pages, Jul. 2002.

"The Effect of Inefficient Software Management Practices on the Business Model", *Moon Light Systems Inc.*, www.moonlight.com, 17 pages, Jan. 2000.

* cited by examiner

SYSTEM AND METHOD FOR CONFIGURABLE SOFTWARE PROVISIONING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to computers and more particularly, to a system and method for provisioning of software on networked computers.

BACKGROUND OF THE INVENTION

A networked computer is a computer connected to a communications network (e.g., an Internet Protocol (IP) network). The computer can function as a server to offer functionality to client computers that are connected to the server over the communications network. The functionality provided by the server is determined by one or more software programs (e.g., applications), which are installed and running on the server. An application typically includes binary (e.g., executable) files, configuration files, etc., residing in one or more directories on the server.

Before an application can be made available to a client computer, a system administrator (or a group of system administrators in a larger enterprise) needs to provision the application onto the server (e.g., an enterprise server). Application provisioning includes the process of deployment, installation, and start-up of the application. During deployment, all of the components (e.g., binary files, configuration files) of the application are transferred to the server. The application then needs to be installed onto the server. During installation, the components of the application are placed into one or more pre-defined directories in the server. Variables in the configuration files of the application are populated with values to provide a desired configuration. The configuration choice can depend on many different aspects including, for example, the type of server in which the application is installed, the IP address or addresses of the server, the subnet in which the server is located, the Virtual Local Area Network (VLAN) segment to which the server belongs, other software already installed on the server, the role of the server within the enterprise, and the underlying operating system (OS) or hardware. The system administrator is generally required to manually enter these values at the time the application is installed. The server may also need to be configured for the software application to become operational. For example, a server registry may need to be edited by the system administrator depending on the type of application that is installed.

A number of conditions may need to be checked to ensure that the application can successfully run on the selected server, such as memory, architecture, any previously installed software, etc. Additionally, the configuration of another application already installed on the server may be affected by the new application and therefore may need to be changed. Once installed and configured, the newly installed application can be started, i.e., have its executable files brought into a running state.

The system administrator is usually responsible for readying the software on all the servers as mentioned above, in such a way that the servers cooperatively offer a desired functionality for a given business objective. Given the complexity of the provisioning process as described above, this can be a very time-consuming task. Furthermore, any small error in the configuration file of a single application on a single server can invalidate the enforcement of the desired functionality of the enterprise as a whole. Errors in the configuration files can go undetected for a long time. Traditional system management software typically will not generate any alerts since all the servers and applications are up and running, and thus are not generating an event to which the system management software can react.

As apparent from the above-described deficiencies with the manual provisioning of applications, a need exists for a system and method for automating the provisioning of the applications onto one or more servers in, for example, an enterprise data center, while ensuring that each deployment, installation, and configuration is executed in such a way that, as a whole, all the servers realize the desired business functionality.

SUMMARY OF THE INVENTION

One aspect of the present invention is directed to a system and method for the automated provisioning of software applications onto one or more managed server machines. The provisioning system uses a model of the application, which describes the application in terms of its software features (e.g., files, code, content) and the actions to manipulate the application (provision, uninstall, etc.). The model preferably describes this information in a general way, such that it is independent of any environmental characteristics associated with the managed server machines. The provisioning system also has access to the configuration files of the application itself (if any). The configuration files contain application-specific configuration information, which can be set by the system administrator (or other operations personnel) depending on the actual environmental characteristics found at the time of application provisioning. The provisioning system also receives as input a set of references to selected ones of the managed server machines onto which the application is to be provisioned (i.e., the target server machines).

Configuration data for the application can be determined by examining the environmental characteristics, including the characteristics of the target server machine, the characteristics of the operating system of the target server machine, the characteristics of other software already provisioned on the target server machine, and the characteristics selected by a user (e.g., a system administrator) at run-time of the provisioning process. Depending on the content of the application model, the environmental characteristics can be determined, for example, by collecting the relevant data from each target server machine, from models of other applications that have been provisioned on the target server machine, from a model of the target server machine (e.g., prepared by the user), and from user generated input at the time of the provisioning. The collected data can be used to generate values for settings within the configuration files of the application and to transform the model of the application into concrete execution steps or instructions, to be executed on each target server machine to provision the application, taking into account all the collected data.

According to another aspect of the present invention, the provisioning system includes a master server and a plurality of agents, with an agent residing on each target server machine. The master server accepts a plurality of types of input, including: (1) Parameterized Application Models (PAM) and Plans (an aggregate of a plurality of PAMS), which are expressed in a modeling language; (2) Parameterized Application Configurations (PAC), which include the original application configuration file and data, wherein some or all of the actual configuration values are replaced by variables following a predefined syntax, and a complete set of resources of the application to be provisioned; (3) Server Machines Models (SMM, of those managed server machines to be targeted by the execution of the Plan, which are expressed in a text file of a predefined syntax (e.g., comma separated value files) or created on the fly by the user through a user interface to the master server; and (4) Variable Settings (VS) relating to an existing PAM, where the VS is expressed in a text file of a predefined syntax (e.g., comma separated value files) or created on the fly by the user through the user interface to the master server.

Through the user interface, the master server allows a user to execute any Plan that was previously input. When a user executes a Plan, the master server allows the user to choose a set of the managed server machines to which the selected plan will apply (i.e., the target server machines). The master server also allows the user to choose a VS for each PAM referenced in the Plan.

To execute a plan, the master server instantiates all the variables in all the referenced PAMs using the information in the relevant VS and SMMs of the target server machines or by directly interacting with the target server machines. The master server then interprets the Plan and its steps and creates instructions for the agents on each of the respective target server machines. The instructions are sent to the agents, together with the data representing the actual application. This data contains the application configuration data, in which all the variables have been substituted with actual values by the master server. The agents receive the instructions and the application data and execute the instructions to provision the application on the corresponding target server machines.

Based on external events, such as the discovery of a security hole or a required performance tuning, a system administrator can be required to reconfigure one or more software applications that have been provisioned on one or more managed server machines. Similarly, new knowledge can lead to changes in the variable settings associated with the applications provisioned on the managed server machines (e.g., to facilitate application integration).

Accordingly, another aspect of the present invention is a system and method for the automated reconfiguration of software applications, which are already provisioned on one or more target server machines. The reconfiguration system uses a model of the application that is to be reconfigured. The model can be, for example, the same model that was used in provisioning the application. The reconfiguration system also has access to the configuration files of the application (if any). Configuration data for the application can be determined by examining various environmental characteristics. The collected data can then be used to generate values for settings within the configuration files of the application, the configuration settings on the target server machine, or the configuration settings associated with other applications already provisioned on the same target server machine.

According to another aspect of the present invention, the reconfiguration system includes a master server that accepts a plurality of types of input, including: (1) a PAM associated with an application previously provisioned on a managed server machine targeted for reconfiguration; (2) a PAC relating to the application; (3) an SMM of the managed server machine targeted for reconfiguration; and (4) a VS relating to the PAM which is different from the VS used during the original provisioning of the application.

The reconfiguration can be executed, for example, via a user interface to the master server. Based on the inputs, the master server creates an internal Plan from which it derives instructions for reconfiguring each target server machine. In one embodiment, the reconfiguration system employs agents on each target server. The instructions, together with the new configuration files (if any) are sent to the agents (on the target server machines). The agents receive the instructions (and the files) and execute the instructions to reconfigure the application.

BRIEF DESCRIPTION OF THE DRAWINGS

A more complete understanding of the present invention and its advantages will be readily apparent from the following Detailed Description of the Preferred Embodiments taken in conjunction with the accompanying drawings. Throughout the accompanying drawings, like parts are designated by like reference numbers and in which.

DETAILED DESCRIPTION OF THE PREFERRED EMBODIMENTS

Figure 1:
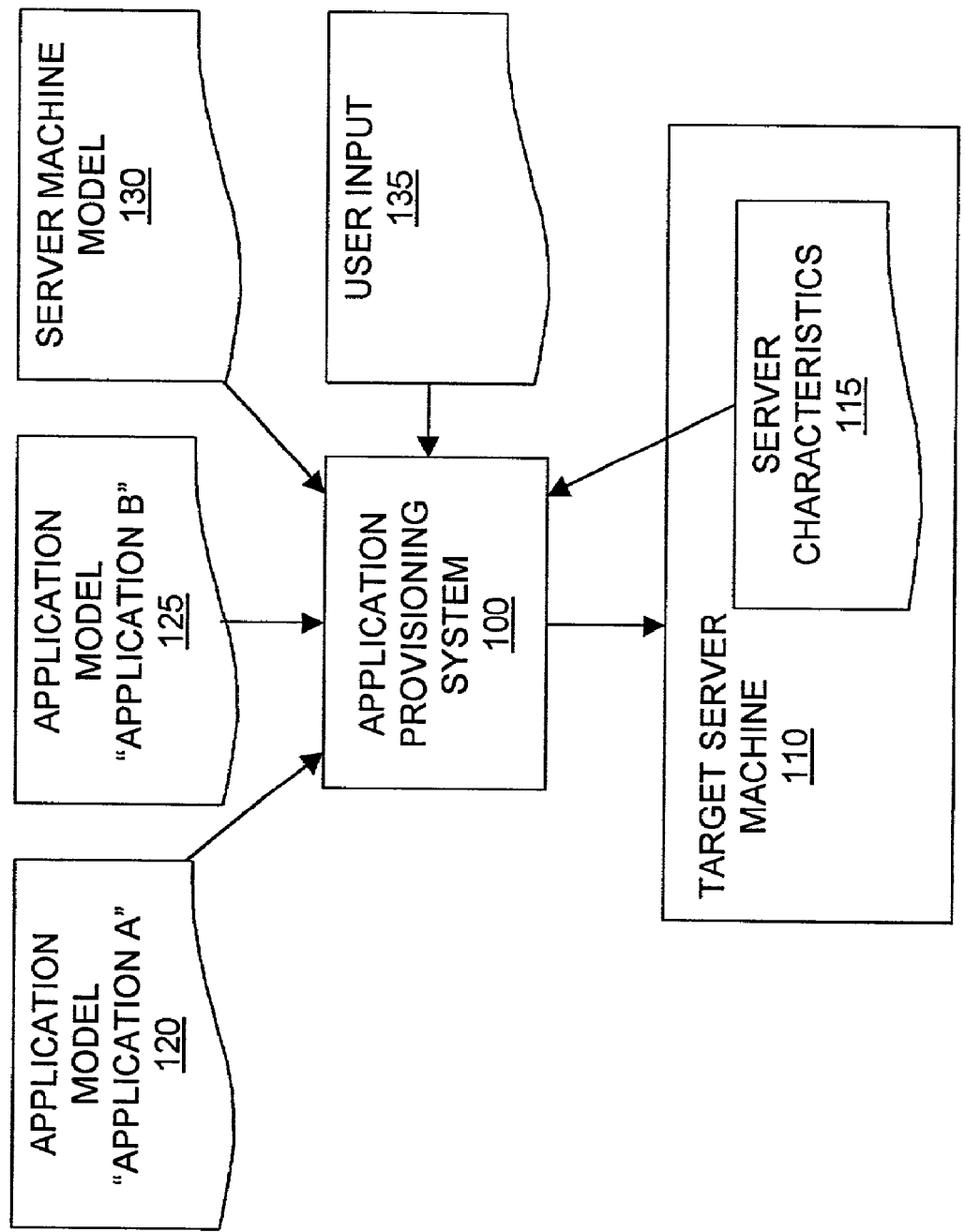
FIG. 1 is a block diagram illustrating an embodiment of an application provisioning system in accordance with the present invention.

An application is a collection of software features that are designed to operate together to perform a specific function (or group of related functions). An application can be acquired as a unit from a software vendor or can be created in-house by a software development group. The software features typically include a collection of diverse file types, including executable code, configuration files, and graphics files for user interfaces. A software resource is a piece of a software feature, such as a file.

A server machine is any networked computer that offers the functionality of applications installed thereon to other computers (e.g., client computers) that are connected to the server machine over a communications network. A Server Machine Model (SMM) is a model that describes the server machine (e.g., its IP address, role in the enterprise, and relevant operating system properties).

Application provisioning is a process of deployment, installation, and start-up of an application. Once an application has been provisioned to the server machine, the application can then be made available to the client computers.

Application deployment is the process of distributing the application onto the server machine(s). During deployment, the components of the application are transferred to a storage medium that is accessible by the server.

Application configuration data is a collection of configuration data associated with an application. The application configuration data can include the configuration files of the application, which are associated with the components of a software feature, and can also include data received via interactive dialog(s) with a user (e.g., a system administrator) who inputs configuration values. Parameterized Application Configuration (PAC) files are configuration files and other configuration data, which can contain variables instead of actual configuration values. The variables can be instantiated any time before the actual deployment process. In one embodiment, the variables can be tagged variables. The tags can indicate, for example, the source of the data with which the variable is to be instantiated.

Application installation is a process of setting up a deployed application. Application installation can include the configuration of a server machine according to configuration data, the execution of the necessary checks to ensure that the application can be brought into a running state, and optionally, the re-configuration of already deployed application(s). Once installed, the application can be brought into a running state (application start-up). Application termination is a process of removing an application from the running state.

An application model is a collection of information that describes the application (including references to all the resources of the application) and the actions used to deploy, install, start-up, and terminate the application. The model can, in one embodiment, be a general framework to describe a particular type of application. In another embodiment, the model can be in a platform-specific installation format (such as the Microsoft Installer (MSI) format for Microsoft Windows or the Red Hat Package Manager (RPM) format for Linux). A Parameterized Application Model (PAM) is an application model where the descriptions and methods contain variables, which can be instantiated any time before the actual deployment process. All of the variables are defined in the PAM, along with the variables used in the corresponding PAC. A plan is a sequence of steps, including actions from existing PAMs. A Variable Setting (VS) relates to a particular PAM and includes a mapping of some or all of the variables in the PAM to actual values, and a mapping of some or all of the variables in the PAC to actual values. In one embodiment, the variables in the PAM and the PAC are tagged variables. The tags can indicate, for example, the source of the data used in instantiating the variables. The VS can map some or all of the tagged variables in the PAM and the PAC to actual values.

Environmental characteristics are a collection of characteristics, which can influence the configuration of an application. Environmental characteristics can include, for example, the characteristics of the target server machine (e.g., IP address, hostname, network connectivity, processors), the characteristics of the operating system of the target server machine (e.g., operating system type and version, patch level), the characteristics of other software already provisioned on the target server machine, and the characteristics selected by a user at run-time of the provisioning process. In one embodiment, the environmental characteristics can include values in an SMM, in a VS, configuration data of other applications already provisioned on a managed server machine, actual data on the managed server machine (rather than modeled data in an SMM), or other relevant data.

FIG. 1 illustrates a block diagram of an embodiment of an application provisioning system 100 of the present invention. The application provisioning system 100 is adapted for automated provisioning of an application "Application A" onto one or more target server machines 110 selected from among a plurality of managed server machines. The application provisioning system 100 employs an application model 120 (of "Application A"), and a reference to the target server machine 110.

The application provisioning system 100 examines the application model 120 and configures the application based on one or more environmental characteristics. The environmental characteristics can be determined by, for example, one or more of the following methods: (1) interrogating the target server machine 110 for its server characteristics 115; (2) examining a model of another application already provisioned on the target server machine 110 (e.g., application model of "Application B" 125); (3) examining a model 130 of the target server machine 110 (e.g., prepared by the user); and (4) from user generated input 135 at the time of the provisioning. Once the relevant environmental characteristics have been determined, the collected data can be used to generate values for configuring the application. In one embodiment, wherein the application includes one or more configuration files, the application provisioning system 100 can configure the application by instantiating variables in the configuration file(s) of the application. In another embodiment, wherein the application does not contain configuration files (e.g., certain Windows-based applications), the application provisioning system 100 can configure the application by generating instructions for editing one or more files or databases on the target server machine 110.

The application provisioning system 100 transforms the application model 120 into concrete execution steps or instructions. The instructions and all relevant files associated with the application can then be deployed to the target server machine 110. The instructions can be executed to install the application on the target server machine 110.

Figure 2:
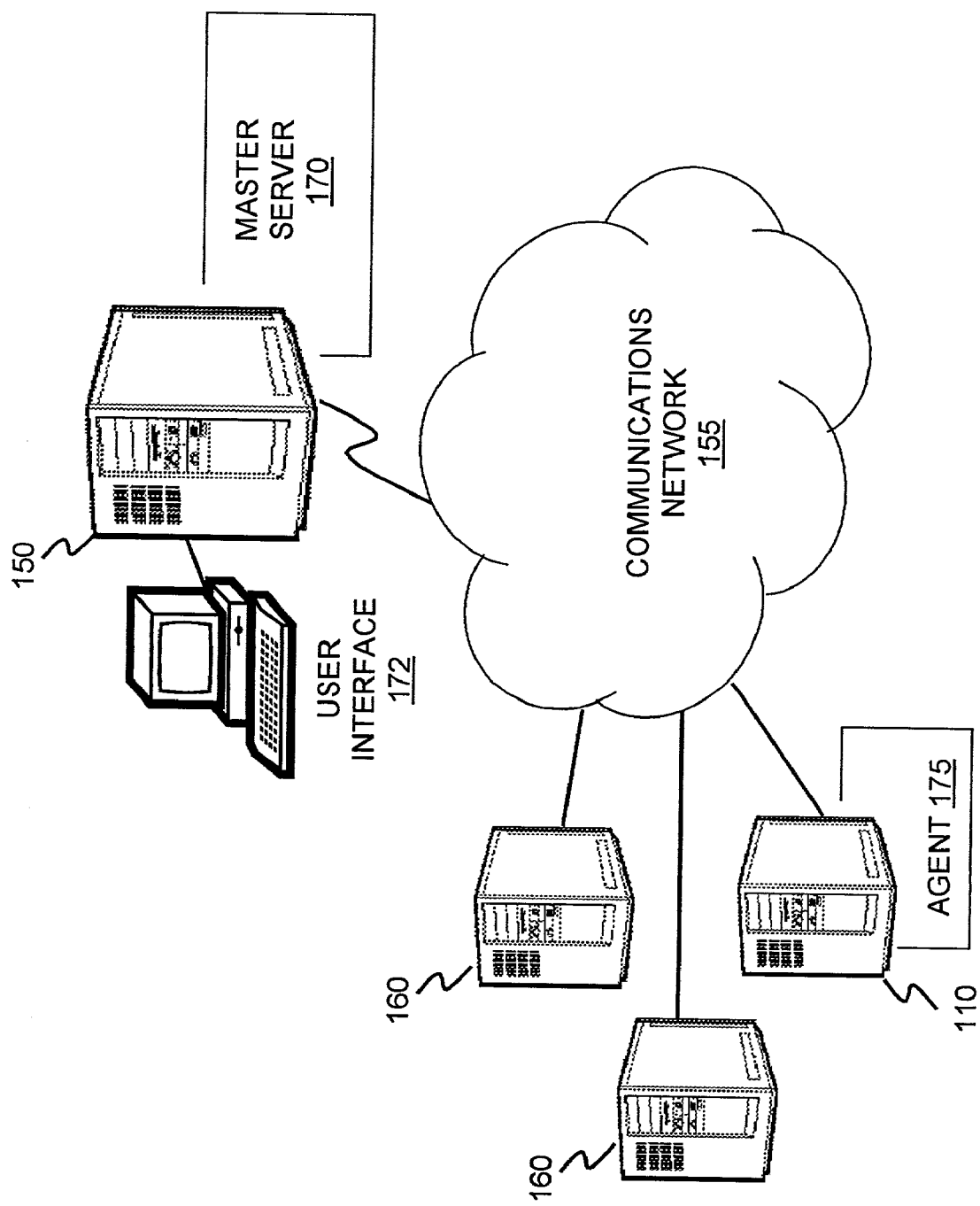
FIG. 2 is a schematic illustration of a computer network in accordance with the present invention.

FIG. 2 schematically illustrates a computer network in which an application can be provisioned in accordance with an embodiment of the present invention. A central computer 150 is connected to a communications network 155. A plurality of managed server machines (computers) 160 are also connected to the communications network 155. The central computer 150 and the managed server machines 160 can include, for example, personal computers, workstations, or server machines, connected to the communications network 155 over one or more physical communications lines, via a wireless system, or any combination thereof. The communications network 155 can be one or more networks, such as local-area networks (LANs), wide-area networks (WANs), etc. employing one or more network protocols (e.g., Internet Protocol).

In one embodiment, the application provisioning system 100 of the present invention includes a Master Server (MS) 170 and at least one agent 175. The master server 170 is, in one embodiment, a program (e.g., a software package) running at the central computer 150, which is preferably a machine used by a system administrator (or other operations personnel). The master server 170 includes a user interface 172 (e.g., a graphical user interface) through which inputs are specified by a user (e.g., the system administrator) and from which the user can issue commands to run one or more PAMs or Plans on a selected set of the managed server machines 160.

An instance of the agent 175 (e.g., another software package) is installed and running on each of the managed server computers 160 to which an application is to be deployed (i.e., the target server machines 110). The managed server machines 160 are typically located in data centers and can, for example, be grouped into clusters. The system administrator, for example, may be in charge of the managed server machines 160 in several physically separate data centers. The system administrator can use the application provisioning system 100 of the present invention to provision applications onto any or all of the managed server machines 160, without regards to their physical location.

The master server 170 communicates with the agents 175 (via the communications network 155, either directly or via some intermediary hops) on the target server machines 110 to execute a given Plan. In one embodiment, the master server 170 delivers to each agent 175 the application data, including the specific configuration data for the particular target server machine 110, and the sequence of instructions that the agent 175 executes to provision the application. Both configuration data and instructions can be specific for each target server machine 110 through the process of instantiating variables differently according to the environmental characteristics associated with the particular target server machine 110.

Figure 3:
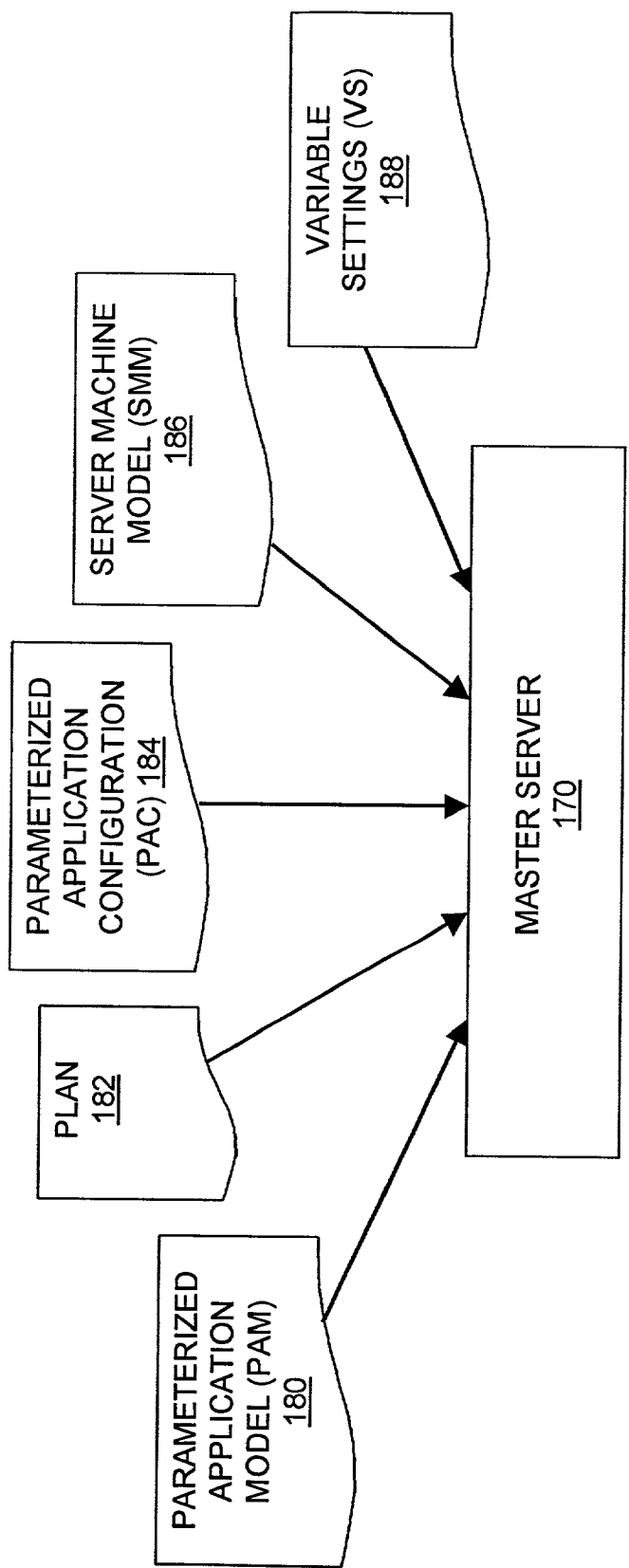
FIG. 3 is a block diagram illustrating inputs to a master server in accordance with the present invention.

FIG. 3 is a simplified block diagram illustrating inputs to a master server 170 in accordance with one embodiment of the invention. The master server 170 is configured to accept a plurality of different types of inputs, including a PAM 180, a Plan 182, a PAC 184, an SMM 186, and a VS 188 relating to the PAM 180 and the PAC 184. For each application which is to be automatically deployed, the master server 170 accepts a PAM 180 (or a Plan 182) and a PAC 184 as inputs.

In one embodiment, the applications can be, for example, web related software applications such as Apache, BEA Weblogic, IBM WebSphere, ATG Dynamo, or Microsoft Internet Information Server. The applications can also include other enterprise software applications, such as Oracle databases (e.g., Oracle 9*i*), Siebel enterprise management software (e.g., Siebel 7 ), etc.

The PAM 180 for each application contains a list of references to all the files associated with each software feature of the application. The PAM 180 also contains a list of references to all the instructions for installation and start-up of the application. To generate the PAC 184, the user can edit the configuration files of the application to replace certain values therein, which are desired to be variable in future installations of the particular application, with tagged variables. Both the PAM 180 and the PAC 184 can contain tagged variables. A variable is a place holder for an actual value (e.g., a configuration value). A tag can be an indication as to where an actual value for the variable can be found. For example, the actual value can be obtained by querying the target server machine 110 itself, from models of other applications that have been provisioned on the target server machine 110, from a model of the target server machine, and from user generated input. A tag can also indicate a hierarchical sequence for locating the actual value. For example, the tag can indicate that the actual value is preferably obtained from a model of the target server machine, but that the target server machine can be queried for the actual value if the model is not available. New tags can be introduced and added to the system as desired. The tags are used by, for example, the master server 170 in collecting the relevant data, in generating the actual values for the variables within the configuration files of the application (PAC 184), and in transforming the PAM 180 into instructions for provisioning the application.

An exemplary PAM for an Apache web server application is shown in Table 1.

TABLE 1

```
<?xml version = "1.0" encoding = "UTF-8"?>
<component xmlns = "http://www.raplix.com/schema/ROX" xmlns:xsi =
"http://www.w3.org/2001/XMLSchema-instance" xsi:schemaLocation =
"http://www.raplix.com/schema/ROX
file:///C:/Documents%20and%20Settings/bhashem/Desktop/ROXSchema/component.xs
d" name = "apache" description = "Apache web server component" softwareVendor =
"CenterRun" author = "Basil Hashem">
    <varList>
        <var name = "ApacheDir" default = "/tmp/apache"/>
        <var name = "Port" default = "80"/>
        <var name = "DocumentRoot" default = "htdocs"/>
        <var name = "ScriptAlias" default = "cgi-bin"/>
        <var name = "RunUser" default = "nobody"/>
        <var name = "RunGroup" default = "nobody"/>
        <var name = "NumStartProcesses" default = "2"/>
        <var name = "InstallUser" default = "root">
        <var name = "InstallGroup" default = "other">
        <var name = "IPAddress" default = ":[target:raIP]"/>
        <var name = "ScriptAliasDir" default = ":[ApacheDir]/:[ScriptAlias]"/>
        <var name = "DocumentRootDir" default =
":[ApacheDir]/:[DocumentRoot]"/>
        <var name "ApacheBinDir" default =":[ApacheDir]/bin"/>
    </varList>
    <resourceList>
        <resource resourceName="apache/bin"          installName="bin"
installPermissions="755"/>
        <resource resourceName="apache/bin/apachect1"          installPath="bin"
installName="apachect1" installPermissions="700"/>
        <resource resourceName="apache/bin/apxs"          installPath="bin"
installName="apxs" installPermissions="700"/>
        <resource resourceName="apache/icons"          installName="icons"/>
        <resource resourceName="apache/logs"          installName="logs"/>
```

TABLE 1-continued

```
        <resource resourceName="apache/libexec"          installName="libexec"/>
        <resource resourceName="apache/conf"          installName="conf"/>
        <resource resourceName="apache/conf/httpd.conf"
installName="httpd.conf" installPath="conf" installPermissions="600"/>
        <resource resourceName="apache/cgi-bin" installPermissions="755"
installName=":[ScriptAlias]"/>
        <resource resourceName="apache/htdocs" installName =
":[DocumentRoot]"/>
    </resourceList>
    <installSteps defaultInstallPath = ":[ApacheDir]"
defaultInstallUser=":[InstallUser]" defaultInstallGroup=":[InstallGroup]">
        <deployResources/>
    </installSteps>
    <uninstallSteps>
        <execNative command = "rm -rf:[ApacheDir]"/>
    </uninstallSteps>
    <controlList>
        <control name = "configtest" description = "Checks the apache config">
            <execNative command = ":[ApacheBinDir]/apachectl configtest"
    matchSource="RESULT_CODE" successMatchExpr="0"/>
        </control>
        <control name = "startup" description = "Start Apache">
            <execNative command = ":[ApacheBinDir]/apachectl start"
    matchSource="STDOUT" successMatchExpr="httpd started"/>
            <pause delaySecs="5"/>
        </control>
        <control name = "restart" description = "Restart Apache">
            <execNative command = ":[ApacheBinDir]/apachectl restart"/>
            <pause delaySecs="5"/>
        </control>
        <control name = "shutdown" description = "Shutdown Apache">
            <execNative command = ":[ApacheBinDir]/apachectl stop"/>
        </control>
        <control name = "verify" description = "Checks that the Apache server is
    running and responding to HTTP requests">
            <processTest timeoutSecs="30"
processNamePattern=":[ApacheBinDir]/httpd" delaySecs="5"/>
            <urlTest timeoutSecs="30" pattern="*" delaySecs="5"
    URL="http://:[IPAddress]::[Port]/" />
        </control>
    </controlList>
</component>
```

An exemplary configuration file, which forms at least a portion of a PAC for the Apache web server application is shown in Table 2.

TABLE 2

```

httpd.conf -- Apache HTTP server configuration file

ServerType standalone

# ServerRoot: The top of the directory tree under which the server's
# configuration, error, and log files are kept.

# NOTE! If you intend to place this on an NFS (or otherwise network)
# mounted filesystem then please read the LockFile documentation
# (available at <URL:http://www.apache.org/docs/mod/core.html# lockfile>);
# you will save yourself a lot of trouble.

# Do NOT add a slash at the end of the directory path.

ServerRoot ":[ApacheDir]"

# ScoreBoardFile: File used to store internal server process information.
# Not all architectures require this. But if yours does (you'll know because
# this file will be created when you run Apache) then you *must* ensure that
# no two invocations of Apache share the same scoreboard file.

ScoreBoardFile logs/httpd.scoreboard

# In the standard configuration, the server will process httpd.conf (this
```

TABLE 2-continued

```
# file, specified by the -f command line option), srm.conf, and access.conf
# in that order. The latter two files are now distributed empty, as it is
# recommended that all directives be kept in a single file for simplicity.
# The commented-out values below are the built-in defaults. You can have the
# server ignore these files altogether by using "/dev/null" (for Unix) or
# "nul" (for Win32) for the arguments to the directives.

#ResourceConfig conf/srm.conf
#AccessConfig conf/access.conf

# Timeout: The number of seconds before receives and sends time out.

Timeout 300

# KeepAlive: Whether or not to allow persistent connections (more than
# one request per connection). Set to "Off" to deactivate.

KeepAlive On

# MaxKeepAliveRequests: The maximum number of requests to allow
# during a persistent connection. Set to 0 to allow an unlimited amount.
# We recommend you leave this number high, for maximum performance.

MaxKeepAliveRequests 100

# KeepAliveTimeout: Number of seconds to wait for the next request from the
# same client on the same connection.

KeepAliveTimeout 15

# Server-pool size regulation. Rather than making you guess how many
# server processes you need, Apache dynamically adapts to the load it
# sees --- that is, it tries to maintain enough server processes to
# handle the current load, plus a few spare servers to handle transient
# load spikes (e.g., multiple simultaneous requests from a single
# Netscape browser).

# It does this by periodically checking how many servers are waiting
# for a request. If there are fewer than MinSpareServers, it creates
# a new spare. If there are more than MaxSpareServers, some of the
# spares die off. The default values are probably OK for most sites.

MinSpareServers :[NumStartProcesses]
MaxSpareServers 10

# Number of servers to start initially --- should be a reasonable ballpark
# figure.

StartServers :[NumStartProcesses]

# Limit on total number of servers running, i.e., limit on the number
# of clients who can simultaneously connect --- if this limit is ever
# reached, clients will be LOCKED OUT, so it should NOT BE SET TOO LOW.
# It is intended mainly as a brake to keep a runaway server from taking
# the system with it as it spirals down...

MaxClients 150

# MaxRequestsPerChild: the number of requests each child process is
# allowed to process before the child dies. The child will exit so
# as to avoid problems after prolonged use when Apache (and maybe the
# libraries it uses) leak memory or other resources. On most systems, this
# isn't really needed, but a few (such as Solaris) do have notable leaks
# in the libraries. For these platforms, set to something like 10000
# or so; a setting of 0 means unlimited.

MaxRequestsPerChild 0

# Listen: Allows you to bind Apache to specific IP addresses and/or
# ports, in addition to the default. See also the <VirtualHost>
# directive.

#Listen 3000
#Listen 12.34.56.78:80

# BindAddress: You can support virtual hosts with this option. This directive
# is used to tell the server which IP address to listen to. It can either
# contain "*", an IP address, or a fully qualified Internet domain name.
# See also the <VirtualHost> and Listen directives.
```

TABLE 2-continued

```

#BindAddress *
BindAddress :[IPAddress]

# ExtendedStatus controls whether Apache will generate "full" status
# information (ExtendedStatus On) or just basic information (ExtendedStatus
# Off) when the "server-status" handler is called. The default is Off.

#ExtendedStatus On
Section 2: 'Main' server configuration

# The directives in this section set up the values used by the 'main'
# server, which responds to any requests that aren't handled by a
# <VirtualHost> definition. These values also provide defaults for
# any <VirtualHost> containers you may define later in the file.

# All of these directives may appear inside <VirtualHost> containers,
# in which case these default settings will be overridden for the
# virtual host being defined.

# If your ServerType directive (set earlier in the 'Global Environment'
# section) is set to "inetd", the next few directives don't have any
# effect since their settings are defined by the inetd configuration.
# Skip ahead to the ServerAdmin directive.

# Port: The port to which the standalone server listens. For
# ports < 1023, you will need httpd to be run as root initially.

Port :[Port]

# If you wish httpd to run as a different user or group, you must run
# httpd as root initially and it will switch.

# User/Group: The name (or #number) of the user/group to run httpd as.
# . On SCO (ODT 3) use "User nouser" and "Group nogroup".
# . On HPUX you may not be able to use shared memory as nobody, and the
# suggested workaround is to create a user www and use that user.
# NOTE that some kernels refuse to setgid(Group) or semctl(IPC_SET)
# when the value of(unsigned)Group is above 60000;
# don't use Group nobody on these systems!

User : [RunUser]
Group : [RunGroup]

# ServerAdmin: Your address, where problems with the server should be
# e-mailed. This address appears on some server-generated pages, such
# as error documents.

ServerAdmin you@your.address

# ServerName allows you to set a host name which is sent back to clients for
# your server if it's different than the one the program would get (i.e., use
# "www" instead of the host's real name).

# Note: You cannot just invent host names and hope they work. The name you
# define here must be a valid DNS name for your host. If you don't understand
# this, ask your network administrator.
# If your host doesn't have a registered DNS name, enter its IP address here.
# You will have to access it by its address (e.g., http://123.45.67.891)
# anyway, and this will make redirections work in a sensible way.

# 127.0.0.1 is the TCP/IP local loop-back address, often named localhost. Your
# machine always knows itself by this address. If you use Apache strictly for
# local testing and development, you may use 127.0.0.1 as the server name.

# ServerName localhost

# DocumentRoot: The directory out of which you will serve your
# documents. By default, all requests are taken from this directory, but
# symbolic links and aliases may be used to point to other locations.

DocumentRoot ":[DocumentRootDir]"

# Note that from this point forward you must specifically allow
# particular features to be enabled - so if something's not working as
# you might expect, make sure that you have specifically enabled it
# below.
```

TABLE 2-continued

```

# This should be changed to whatever you set DocumentRoot to.

<Directory ":[DocumentRootDir]">

# Controls who can get stuff from this server.

    Order allow,deny
    Allow from all
</Directory>

# AccessFileName: The name of the file to look for in each directory
# for access control information.

AccessFileName .htaccess

# The following lines prevent .htaccess files from being viewed by
# Web clients. Since .htaccess files often contain authorization
# information, access is disallowed for security reasons. Comment
# these lines out if you want Web visitors to see the contents of
# .htaccess files. If you change the AccessFileName directive above,
# be sure to make the corresponding changes here.

# Also, folks tend to use names such as .htpasswd for password
# files, so this will protect those as well.

<Files~"^\.ht">
    Order allow,deny
    Deny from all
</Files>
```

The user can create a Plan 182, which combines one or more PAMs 180 to form a predefined sequence of application provisioning steps. The user can create as many Plans 182 as different provisioning scenarios are desired. A Plan 182 can include references to models of several applications. An exemplary Plan for the Apache web server application is shown in Table 3.

TABLE 3

```
<?xml version = "1.0" encoding = UTF-8"?>
<executionPlan xmlns = "http://www.raplix.com/schema,/ROX" xmlns:xsi =
"http://www.w3.org/2001/XMLSchema-instance" xsi:schemaLocation =
"http://www.raplix.com/schema/ROX
file:///C:/Documents%20and%20Settings/bhashem/Desktop/ROXSchema/plan.xsd"
name = "deploy_apache" description = "Deploys the Apache web server">
    <installComponent componentName = "apache"/>
</executionPlan>
```

The master server 170 can receive an SMM 186 for each of the managed server machines 160 that will be targeted for application provisioning. As an alternative, one SMM 186 can be used for each group of target server machines 110 having a particular configuration. The SMM 186 can include information about the platform (Windows, Solaris, etc), the IP address, the name of the server, etc. If an SMM 186 is not available, or if the user so chooses, the master server 170 can interact with the agent 175 on the target server machine 110 to obtain the information that would typically be included in an SMM 186. Alternatively, the master server 170 need not interact with the agent 175, but can instead directly interrogate the target server machine 110 to obtain the same information. The user can specify that some or all variables in a PAM 180 and a PAC 184 are instantiated by the values in the SMM 186. In an embodiment wherein the PAM 180 and the PAC 184 contain tagged variables, the tag associated with each variable can indicate whether the variable is to be instantiated by the values in the SMM 186. A portion of an exemplary SMM is shown in Table 4.

TABLE 4

SMM_extranet_m1: \\model for server extranet_m1
(raIP, 192.18.75.5),

TABLE 4-continued (hostname, extranet_m1)
(num_cpu, 2)
(numStartProcess, 4*num_cpu)

The master server 170 can also receive a VS 188 for each different type of future installation of the application. A VS 188 can include actual values for some or all of the variables in the PAM 180 and the PAC 184. For example, an application can be provisioned in a data center for use in a staging environment (e.g., wherein performance settings are set at a low level for testing purposes) and in a production environment (e.g., wherein performance settings are set at a higher level). The user can create a different VS 188 for each case. As a result, the application provisioning system will provision the application in a customized fashion in each case. A portion of an exemplary VS is shown in Table 5.

TABLE 5

VS_Apache Extranet \\Comment: Relates to PAM "apache". Configuration for staging area of extranet.
(ApacheDir, /opt/app/apache),
(Port, 8080),
(InstallUser, ExtranetAdmin),
(InstallGroup, ExtranetAdminGroup)

The application provisioning system 100 allows a user to automatically provision any application, which has a PAM 180 and a PAC 184, onto an arbitrary set of one or more managed server machines 160, which may have SMMs 186 associated therewith. The user selects a PAM 180 (or a Plan 182, which aggregates a plurality of PAMs 180), a set of target server machines 110, and a VS 188 for execution. The user can repeat this process many times, using different VSs 188 as desired. The user can also repeatedly add new PAMs 180, Plans 182, PACs 184, or VSs 188 and then use them in any combination for application provisioning. The application provisioning system 100 generates a sequence of instructions for provisioning the application based on the selected PAM 180 (or Plan 182) and the selected target server machine(s). A portion of an exemplary sequence of instructions is shown in Table 6.

TABLE 6

```
BEGIN
    defaultInstallPath = "/opt/app/apache";
    defaultInstallUser = "ExtranetAdmin";
    defaultInstallGroup = "ExtraNetAdminGroup";
    moveDir.("./apache/bin", defaultInstallPath & "bin", defaultInstallUser,
defaultInstallGroup);
    moveFile("./apache/conf/httpd.conf", defaultInstallPath & "httpd.conf",
defaultInstallUser, defaultInstallGroup);
    ....
END
```

Figure 4:
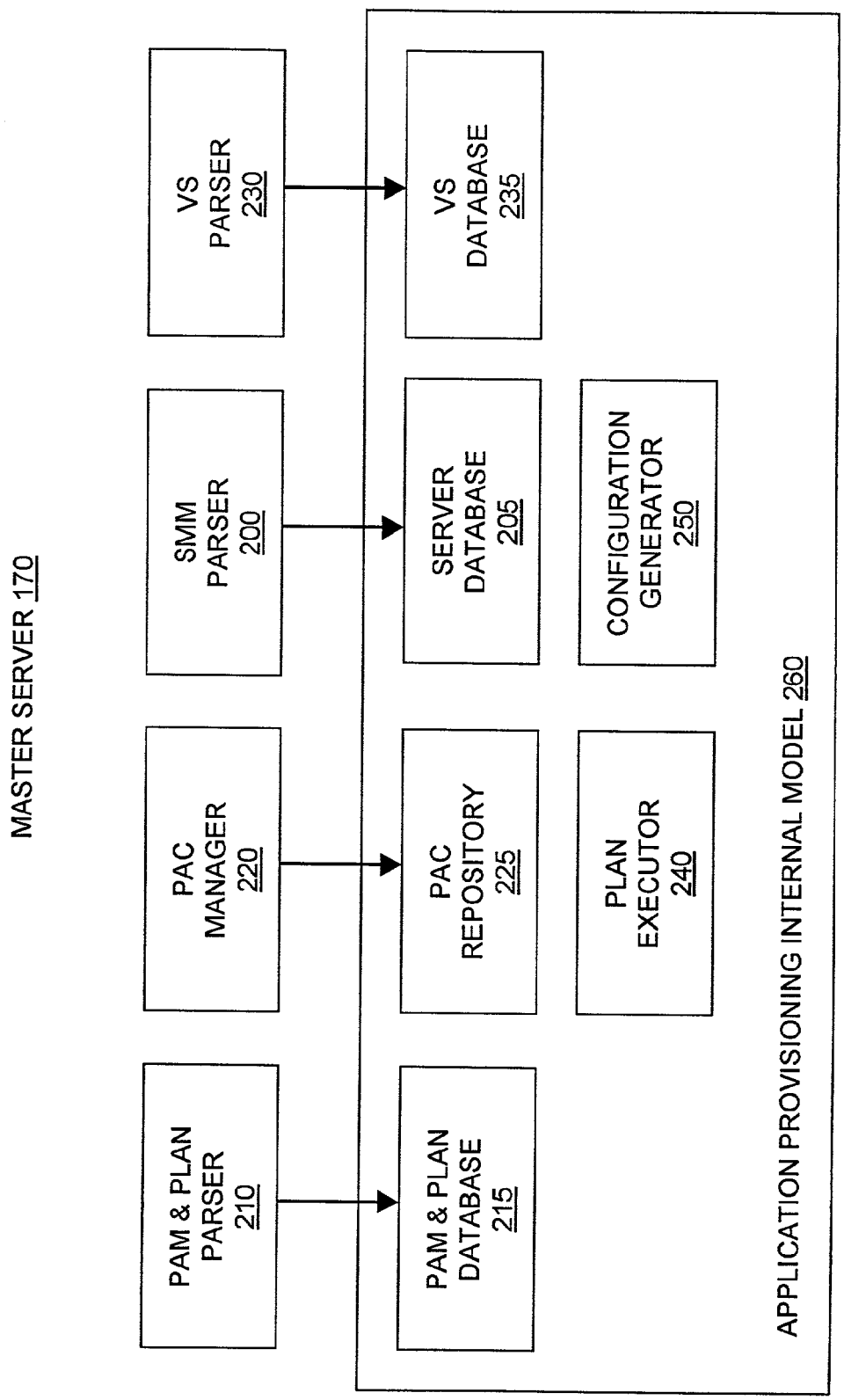
FIG. 4 is a block diagram illustrating a plurality of internal modules of a master server in accordance with the present invention.

FIG. 4 depicts an embodiment of a plurality of internal modules of a master server 170 in accordance with the present invention. The master server 170 contains a plurality of modules, which collectively transform inputs received by the application provisioning system 100 into an internal data model. In this embodiment, the modules of the master server 170 includes an SMM Parser 200, a PAM & Plan Parser 210, a PAC Manager 220, a VS Parser 230, a Plan Executor 240, and a Configuration Generator 250.

Referring to FIGS. 3 and 4, an SMM 186 can describe a particular target server machine 110 (or group of target server machines) using a plurality of attributes. In a preferred embodiment, the SMM 186 includes static server attributes, such as ServerType, ServerName, IP_address, etc. Each SMM 186 used in a particular provisioning typically contains the same static server attributes. The SMMs 186 can also contain one or more dynamic server attributes. The format of an SMM 186 can, for example, be a text file containing a sequence of name-value pairs. For static server attributes, the name can be one of the predefined names, and the value can be a string defining the value of the static server attribute:

(static_name1, value1 ), (static_name2, value2), . . .

For dynamic server attributes, both the name and the value can be any string chosen by the user:

(dynamic_name1, value1 ), (dynamic_name2, value2), . . .

A directory is typically used to record information regarding a particular group of objects (e.g., server machines). A directory service is used to store and retrieve information from a directory. In another embodiment, a directory service and interface, such as the lightweight directory access protocol (LDAP), can be used (e.g., within a data center) to store the SMM 186.

For each target server machine, the SMM Parser 200 reads the corresponding SMM 186, checks that all the static server attributes are defined, and transforms all the server attributes (both static and dynamic) in the SMM 186 into one or more entries in a Server Database 205 portion of an Application Provisioning Internal Model 260. In the embodiment wherein the SMM 186 contains a sequence of name-value pairs, the SMM Parser 200 transforms the data by parsing each name-value pair, and creating, for each name-value pair, a corresponding entry in the Server Database 205. The SMM Parser 200 can be built using standard compiler technology. For example, the software tools "lex" (or "flex") and "yacc" (or "bison"), which are freely available in the UNIX operating system environment under the GNU license, can be used to implement the SMM Parser 200. It is standard practice to program these tools with the syntax of the input under consideration (in this case, the SMM syntax) and the preferred output structure (in this case, the server database entry) to thereby obtain the SMM Parser 200 for transforming the SMM 186 into entries in the Server Database 205.

The PAM & Plan Parser 210 receives, as an input, a PAM 180 or a Plan 182. In one embodiment of the invention, the PAM 180 (or the Plan 182) is expressed in Extensible Markup Language (XML). In another embodiment of the invention, the PAM 180 or the Plan 182 can be expressed in Common Information Model (CIM), a modeling approach that maintains modeled information in a managed object format (MOF) text file. Of course, other object-oriented modeling approaches can also be used.

In an embodiment wherein the PAM 180 is expressed in XML, the PAM 180 can be specified via an XML element called component. The XML element component can have one or more XML attributes, such as, Name, Software Version, and SoftwareVendor. The attribute Name refers to the name of the application. The attribute SoftwareVersion refers to the version description of the application. The attribute SoftwareVendor refers to the name of the vendor. Of course, the PAM 180 can also be expressed using XML elements and attributes other than those described herein. In an embodiment wherein the PAM 180 is expressed in CIM, MOF object descriptions can be used in place of the XML elements.

The XML element component can also include a plurality of XML child elements, such as, ResourceList, InstallSteps, UninstallSteps, ControlList, and VarList. The element ResourceList can have one or more XML child elements of its own, of the type Resource. An XML element of the type Resource is a resource of the application (e.g., a binary file, a configuration file, a directory, a Web page). In a preferred embodiment, elements of the type Resource can have one or more XML attributes, such as, ResourceName, InstallPath, and InstallPermission. The attribute ResourceName can be a string with the name and directory path of a resource. The attribute InstallPath can be a string with the name and path of the resource once it is deployed. The attribute InstallPermission can refer to the access permission of the resource once it is deployed.

The element InstallSteps can have one or more XML attributes and XML child elements, such as, DefaultInstallPath (a directory path in which the resources are installed by default), DefaultInstallUser (a default user to be assigned as an owner of the resources of the component), and Plansteps (which are XML child elements of an XML element executionPlan). The element UninstallSteps can have one or more XML child elements, such as, Plansteps.

The element ControlList can have one or more XML child elements of the type Control. In a preferred embodiment, elements of the type Control perform a control service for the component and can have one or more XML attributes and XML child elements, such as, Name (a name of the control service) and Plansteps. Elements of the type Control can include plan steps to (1) start the application (i.e., bring the application into a running state), (2) stop the application, and (3) effect configuration changes on the server. In a preferred embodiment, each of these functionalities can be recognized by their given name.

The element VarList can have one or more XML child elements of the type Var. In a preferred embodiment, an element of the type Var is a variable used within the component or the PAC and can have one or more XML attributes, such as Name (a name of the variable), and Default (a default value of the variable).

In one embodiment, a Plan 182 can be described by an XML element called executionPlan. The element executionPlan can have one or more XML attributes, including, Name (a name of the plan). The element executionPlan can include one or more XML child elements (Plansteps), such as InstallComponent and UninstallComponent. The element InstallComponent causes the XML element InstallSteps within a component to be executed. The element UninstallComponent causes the XML element UninstallSteps within a component to be executed. For example, the provisioning of a component can include the uninstallation of a previously provisioned component, which may be an earlier version of the application.

Other examples of XML child elements of the XML element executionPlan and of various PAM XML elements include: DeployResources, CopyFile, ChangePermission, ChangeRegistryKey, CheckDependency, ExecNative, ProcessTest, and ExecuteNamedControl. The element DeployResources, which can typically be found within the element InstallSteps, deploys the resources of the associated PAM 160 according to their attributes (e.g., InstallPath, InstallPermissions, ResourceName). The element CopyFile copies or moves one or more files on the target server. The element CopyFile can have a plurality of XML attributes, such as, Source, which are pathnames of one or more files to be copied, and Destination, which is a pathname of the directory or folder into which the files are to be copied. The element ChangePermission changes the access permission of files on the target server. The element ChangePermission can have one or more XML attributes, including Files, which are pathnames of a file set on the target server, and Permissions, which is a textual representation of the new permission of the files.

The element ChangeRegistryKey changes the registry configuration (on machines which have a registry). The element can include one or more XML attributes, such as, Key (the registry key to be changed or created), EntryName (an Entry of the key to be changed or created), EntryValue (a new value of the Entry), and Operation (the operation to be performed, e.g., change, add, delete). The element CheckDependency checks for the existence of an installation of another component on the target server. The element can include XML attributes, such as, ComponentName (a name of the XML element component to check for dependency), ComponentVersion (a version of the XML element component to check for dependency), InstallPath (an installation path of the corresponding component), and BooleanDependency (a relationship to a version of the installed component, e.g., equal, greater_than, greater_than_equal).

The element ExecNative allows for the execution of an arbitrary (shell) command on the target server machine 110. The element can include one or more XML attributes, such as, Command (a string representing the command to be executed), SuccessMatch (a regular expression used verify the output of the executed command), and MatchSource (a source of the command output). The element ProcessTest allows for verification that a particular process is running on the target server machine 110. The element can include one or more XML attributes, such as ProcessNamePattern (a regular expression defining the process name) and DelaysSecs (the number of seconds to wait before executing the text).

The element ExecuteNamedControl executes a named control service of a component. The element can include XML attributes, such as Name. The attribute Name can be the name of an XML element Control in the parent XML element component or the name of an XML element Control within a different XML element component, which relates to an application already provisioned on the target server machine 110.

In one embodiment of the present invention in which the PAM 180 is expressed in XML, the application provisioning system 110 supplies an XML Schema for the XML elements component and executionPlan. An XML Schema is a standardized way of defining the required XML sub-elements, attributes, and data-types of an XML element.

In one embodiment, the variables in a component can be declared (in a Variable Declaration subsection of the PAM 180) as in the following example:

```
<varlist>
    <var name= "doc_root" default= "/root/apache/html" />
    <var name= "thread_count" default= "4"/>
</varlist>
```

A declared variable can then be referenced (in a Variable Substitution subsection of the PAM 180) using the syntax
:[varname]

where varname can include, among other things,: (1) a variable previously declared within the component; (2) a predefined variable name (e.g., name, softwareVendor) referring to the XML attribute component of the same name; (3) a target attribute reference, where attr is the name of a dynamic server attribute or a static server attribute (e.g., :[target:attr]); (4) an external reference, where the reference is the name of a variable in a second component, which is already installed on the server that the instant component is being installed on (e.g., :[component:compRef:varname]); or (5) an external reference, where the reference is a name of a value residing on the target server machine 110. In a preferred embodiment for a target server machine 110 using a Microsoft Windows operating system, the variable reference is to a WMI (Windows Management Interface) attribute (e.g., :[server:WMI_object:WMI_attribute]).

The variable reference (in any of the above enumerated cases) can be placed in a variety of positions within the XML elements component and executionPlan. A variable can be placed within a plan step that is syntactically within a component; for any attribute which describes a entity on a target server. Following is a possible subset of XML attributes where variables can be placed:

XML attributes InstallPath and InstallPermission of the XML element resource;

XML attributes defaultInstallPath, defaultInstallUser of the XML element installSteps;

XML attribute InstallPath of the XML element checkDependency;

XML attributes command and checkMatch of the XML element execNative;

XML attributes source and destination of the XML element copyFile;

XML attributes file and permissions of the XML element changePermission;

XML attributes key, entryValue, and entryName of the XML element changeRegistryKey;

XML attribute processNamePattern of the XML element processTest.

For each new component or plan, the PAM & Plan Parser 210 reads the corresponding file, checks the XML to be well-formed (i.e., syntactic correctness) and valid (i.e., adhering to the corresponding XML Schema). The PAM & Plan Parser 210 then transforms the data into an entry in the PAM & Plan Database 215 portion of the Application Provisioning Internal Model 260. The PAM & Plan Parser 210 can be built using standard compiler technology to parse an XML file and to create an entry in the PAM & Plan Database 215. For example, the validating XML parser "Xerces" is freely available from the Apache XML Project. It is standard practice to program tools such as Xerces with the XML schema of the input under consideration and the preferred output structure (in this case, the PAM & Plan Database entry) to thereby obtain the PAM & Plan Parser 210 for transforming a PAM 160 or a Plan 165 into entries in the PAM & Plan Database 215.

A configuration file of an application generally specifies a number of settings, which affect the installation and operation of the application. For example, if the application is a Web server, the configuration file can specify, among other things, a TCP port on which the server application is listening for incoming client requests, and a location on the server wherein the Web content is stored.

In one embodiment of the invention, a PAC 184 includes one or more configuration files of the application, where one or more configuration values are replaced with references to variables. Within the scope of such a configuration file, the syntax of a variable reference can be as follows:
:[varname]

where varname is the name of a variable declared in the corresponding PAM 180. More specifically, varname can be the name of a variable in the XML element VarList of the corresponding XML element component. Alternatively, varname can be the name of a predefined variable (Name, SoftwareVersion, SoftwareVendor, etc.), which refers to an XML element of the same name.

The PAC Manager 220 reads in the PAC 184 and places it into a PAC Repository portion of an Application Provisioning Internal Model 260. For example, the PAC Repository can be a directory having a name that identifies the application to which the PAC belongs. In one embodiment, the PAC Repository is an Application & PAC Repository 225 for storing both the PAC 184 and the resources of the application to be provisioned.

A VS 188 specifies values for variables defined in the corresponding PAM 180. A value specified in the VS 188 overrides the variable's default value, which was specified at the variable declaration. A VS 188 can specify such values for any number of variables, as long as they are defined in the corresponding PAM 180.

In one embodiment of the invention, the syntax of a VS 188 is a text file with a sequence of name-value pairs:
(name1, value1 ), (name2, value2 ), . . .

A name (e.g., name1, name2) should, in a preferred embodiment, correspond to a variable name defined in the corresponding PAM 180. Furthermore, the sequence of the variables in the VS 188 is preferably the same as the sequence of variable declarations in the corresponding PAM 180. A value (e.g., value1, value2) can be either a string with the actual variable value, or an expression as defined in the Variable Substitution subsection of the corresponding PAM 180. However, if the value is a reference to a variable varname, the variable with name varname is preferably defined at an earlier stage in the PAM variable definitions to avoid circularity of reference.

In one embodiment, the VS 188 is stored in a database that is external to the central computer 150. In such an embodiment, the application provisioning system 100 (e.g., the master server 170) is capable of accessing the database to retrieve the VS 188. The application provisioning system can be configurable such that a user can specify (e.g., at set up) the type and location of the database wherein the VS 188 is stored. Additionally, in an embodiment wherein a plurality of VS 188 files are available, each VS 188 can be stored in a different database as desired.

The VS Parser 230 reads in a VS 188, checks that each name corresponds to a defined variable in the PAM 180 and then checks the VS 188 into a VS Database 235 portion of an Application Provisioning Internal Model 260. As in the case of the SMM Parser 200, software tools like "lex" (or "flex") and "yacc" (or "bison") can be used to implement the functions of checking and transforming the VS 188 into entries in the VS Database 235.

Referring to FIGS. 3, 4, 5A, 5B, and 5C, when a user chooses to execute a Plan 182 on a set of target server machines 110 associated with a given VS 188, the Plan Executor 240 retrieves the selected Plan 182 from the PAM & Plan Database 215 and creates an object (in memory) that is a representation of the Plan 182. For example, in one embodiment, the Plan Executor 240 can create a Java object mirroring the structure of the original XML element. The Plan Executor 240 also retrieves, for each PAM 180 referenced in the Plan 182, a corresponding PAM entry from the PAM & Plan Database 215 and creates an object (in memory) that is a representation of the PAM 180, and which mirrors the original XML element.

The Plan Executor 240 retrieves, for each fetched representation of a PAM 180, a corresponding VS 188 from the VS Database 235. In a preferred embodiment, the selection of a particular VS 188 can be based on a user selection. If so, the Plan Executor 240 receives a user input, for example, via the User Interface 172. The user can select different VS files 188 for provisioning an application for different purposes, such as in a staging environment or in a production environment. The Plan Executor 240 then retrieves, for each target server machine 110, the corresponding SMM 186 in the Server Database 205 (if it is present). The Plan Executor 240 then passes the PAM 180, VS 188, and SMM 186 to the Configuration Generator 250. The Configuration Generator 250 transforms the VS 188 into a Generated VS 270. The fully instantiated Generated VS 270 can be stored in a repository (e.g., VS repository 275). The Generated VS 270 can be later retrieved from the repository for other uses (beyond the current plan execution), such as uninstalling an application.

The Plan Executor 240 initiates the actual execution of the Plan 182. For each target server machine 110, one or more steps are executed for each Plan step. The steps to be executed can include, for example, the following:

If the plan step is installComponent, call the Instantiate_PAM function of the Configuration Generator 250 with (1) a PAM object, (2) the corresponding, Generated VS 260, and (3) the corresponding SMM 186 as inputs.

If the plan step is installComponent, call the Instantiate_PAC function of the Configuration Generator 250 with (1) all PAC instances related to the PAM, (2) the corresponding, Generated VS 270, and (3) the corresponding SMM 186 as inputs.

If the plan step is installComponent, the Plan Executor 240 picks the installSteps objects of the PAM 180 and recursively calls the Plan Executor 240 for each step in this object with the fully instantiated PAM, VS, SMM as parameters.

If the plan step is deployResources, the Plan Executor 240 collects all references to resources in the PAM object. The Plan Executor 240 then transfers the resources (including all PACs belonging to the application and referenced by the PAM) to the target server machine. For each resource, the Plan Executor 240 then creates instructions (e.g., file and directory manipulation steps) for the agent 175 to place the resource according to the resource's XML attributes (such as installPath, installPermission, etc).

If the plan step is exec_native, the Plan Executor 240 passes the exact strings of the XML attributes (command, successMatch) to the agent 175, which executes the command attribute on a suitable command line interpreter (e.g., shell) and returns the result to execute the success match evaluation.

If the plan step is checkDependency, the Plan Executor 240 creates instructions (file and directory manipulations) for the agent 175 to discover if an application exists on the target server machine where the agent 175 resides using, for example, the values of the parameters name, installPath, etc.

If the plan step is processTest, the Plan Executor 240 creates instructions for the agent 175 to discover a process, using the values of processNamePattern, and delaySecs.

If the plan step is uninstallComponent, the Plan Executor 240 picks the particular VS (from the VS Repository 275) corresponding to the plan execution, and which provisioned the PAM on the target server machine 110. This ensures that the variable values used for the provisioned applications are taken into account. The Plan Executor 240 then calls the Configuration Generator 250 for the PAM with (1) the plan-step, (2) the PAM object, (3) the selected VS, and (4) the corresponding SMM to instantiate the PAM. The Plan Executor 240 then picks the uninstallSteps objects of the PAM and recursively calls the Plan Executor 240 for each step in this object with the fully instantiated PAM, VS, SMM as parameters.

The Configuration Generator 250 is capable of perform a plurality of functions, including the creation of a Generated VS 270 that is a function of the associated PAM, VS, and SMM. To create the Generated VS 270, the Configuration Generator 250 can perform one or more steps, including the following steps.

(1) The Configuration Generator 250 can add, to the Generated VS 270, a variable name and a default value of a variable that is defined in the PAM 180, but absent in the VS 188. In case of a predefined variable, the Configuration Generator 250 can take the corresponding value from the PAM 180.

(2) The Configuration Generator 250 can substitute any reference in the VS 188 of the form, :[target:attr], with a value v, which is found in the SMM name-value pair
(name, v), where name=attr. If no such pair is found, then the Configuration Generator 250 may stop and return an error.

(3) The Configuration Generator 250 can substitute any reference in the VS 188 having the following form, :[component:compRef:varname]. In order to perform the substitution, the Configuration Generator 250 retrieves a previous Generated VS 270 from the VS Repository 275. The Configuration Generator 250 selects a Generated VS 270, which represents the latest deployment of the application corresponding to compRef on the target server machine represented by the SMM 186. If no such Generated VS 270 exists, the Configuration Generator 250 may stop and return an error. Otherwise the Configuration Generator 250 selects a value v, which is found in the VS name-value pair (name, v), where name=varname. If no such pair is found, then the Configuration Generator 250 may stop and return an error (4) The Configuration Generator 250 can substitute any reference in the VS 188 having the following form, :[server:WMI_object:WMI_attribute]. In order to perform the substitution, the Configuration Generator 250 contacts the agent 175 on the target server machine 110 indicated in the reference and instructs the agent 175 to issue a query for the WMI service on that server, specifying the WMI object and its attribute and to send back the value returned by the query. This value is used for the substitution.

(5) The Configuration Generator 250 can substitute any variable reference in the VS 188 of the form, (varname1 , :[varname2]). In one embodiment, the Configuration Generator 250 can be programmed to execute the following steps: (a) if varname2 is a predefined variable, look up the corresponding value from the corresponding PAM 180; (b) check to see if the corresponding VS 188 defines a value for varname2, and if so, return the result of recursively evaluating its value; (c) check to see if the PAM 180 defines a default value for varname2, and if so, return the result of recursively evaluating its value; (d) if none of the above holds, return an error.

The Configuration Generator 250 can also be used to instantiate the PAM 180 as a function of the associated Plan steps, PAM objects, the Generated VS, and the SMM 186. The Configuration Generator 250 can instantiate the PAM 180 by performing one or more steps, including the following steps.

(1) Substituting any reference in the PAM 180 of the form :[target:attr] with a value v, which is found in the SMM 186 name-value pair (name, v), where name=attr. If no such pair is found, then the Configuration Generator 250 can stop and return an error.

(2) Substituting any reference in the PAM 180 of the form :[component:compRef:varname]. The Configuration Generator 250 can retrieve a Generated VS 270 from the VS Repository 275. In a preferred embodiment, the VS that represents the latest deployment of the application corresponding to "compRef" on the server represented by the SMM 186 is selected. If no such Generated VS exists, the Configuration Generator 250 can stop and return an error. Otherwise a value v, which is found in the VS name-value pair (name, v), where name=varname, is returned. If no such pair is found, the Configuration Generator 250 can stop and return an error.

(3) The Configuration Generator 250 can substitute any reference in the PAM 180 having the following form,: [server:WMI_object:WMI_attribute]. In order to perform the substitution, the Configuration Generator 250 contacts the agent on the target server indicated in the reference and instructs the agent to issue a query for the WMI service on that server, specifying the WMI object and its attribute and to send back the value returned by the query. This value is used for the substitution.

(4) Substituting any variable reference of the form: [varnameN]. The VS is searched until a name-value pair of the form (varnameN, v) is found. If such a pair is found, replace the variable reference with the value v. Otherwise, determine if varnameN is a predefined variable of the corresponding PAM 180. If so, the variable reference can be replaced by the value retrieved from the PAM 180. Otherwise, stop and return an error.

The Configuration Generator 250 can also be used to instantiate the PAC 184 as a function of all the associated PACs, the Generated VS, and the SMM. Instantiation of the PAC 170 can be performed by, for example, the following steps. Substituting any variable reference of the form :[varnameN]. The VS can be searched until a name-value pair of the form (varnameN, v) is found. If no such pair is found, the Configuration Generator 250 can stop and return an error. Otherwise, the variable reference can be replaced with the value v.

In a preferred embodiment, the application provisioning system includes an agent 175 running on each target server machine. The agent 175 provides an interface, which includes methods and function calls to a Plan Executor 240. For each plan step described above, the interface offers a corresponding method or function call. Such methods are likely to be built out of simpler operations, for manipulating the target server machine's file system and processes. For each plan step, the Plan Executor 240 can generate one instruction for the agent 175, which directly corresponds the plan step. The agent 175 can then perform the instruction to provision the application on the target server machine 110. In an embodiment wherein the target server machines 110 are clustered, the instructions can include instructions for causing a particular target server machine 110 to be removed from the cluster during the provisioning process. The instructions can also include instructions for restoring the target server machine 110 to the cluster once provisioning is complete.

Figure 5A:
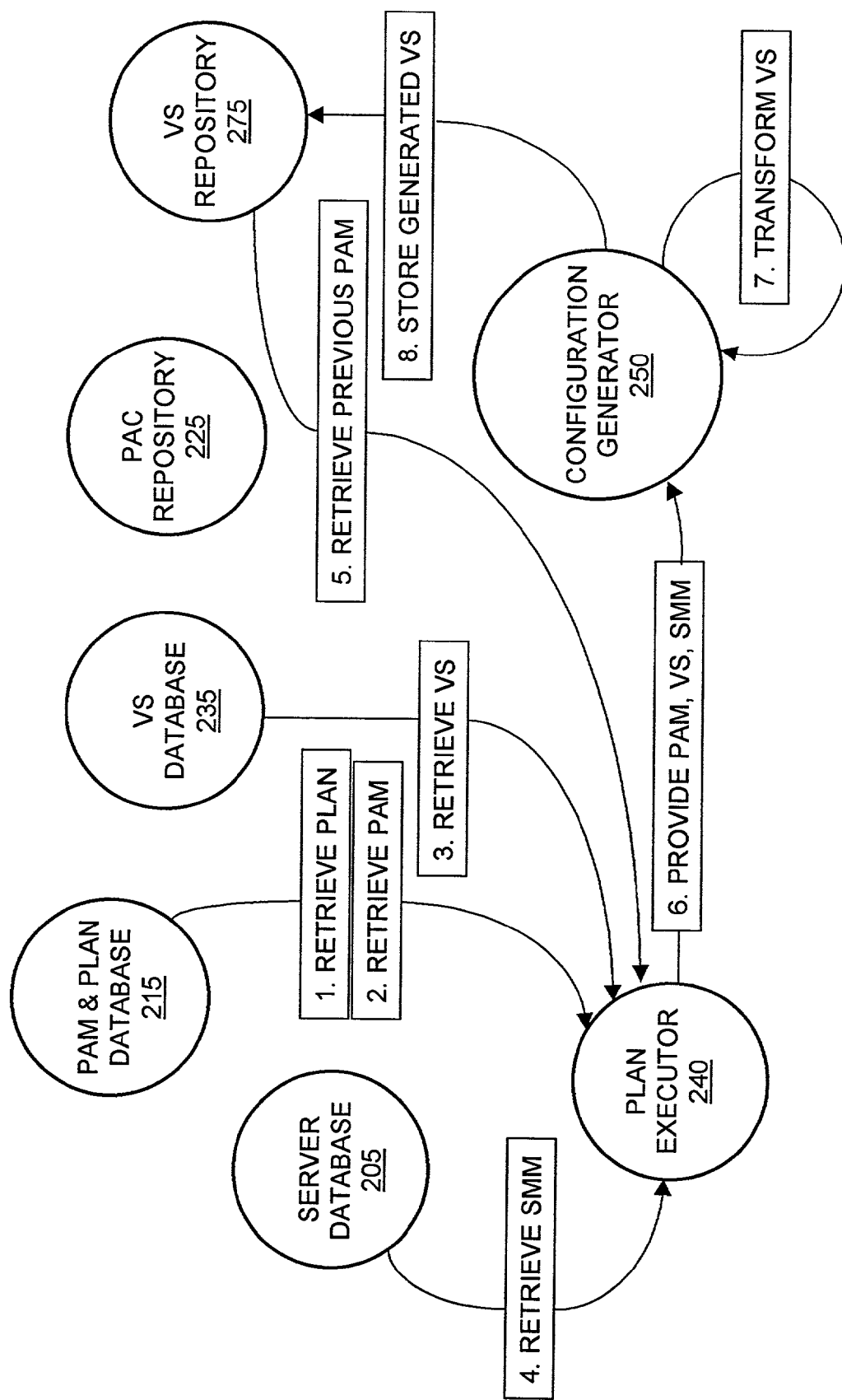
FIGS. 5A, 5B, and 5C illustrate a state diagram for provisioning applications in accordance with the present invention.
Figure 5B:
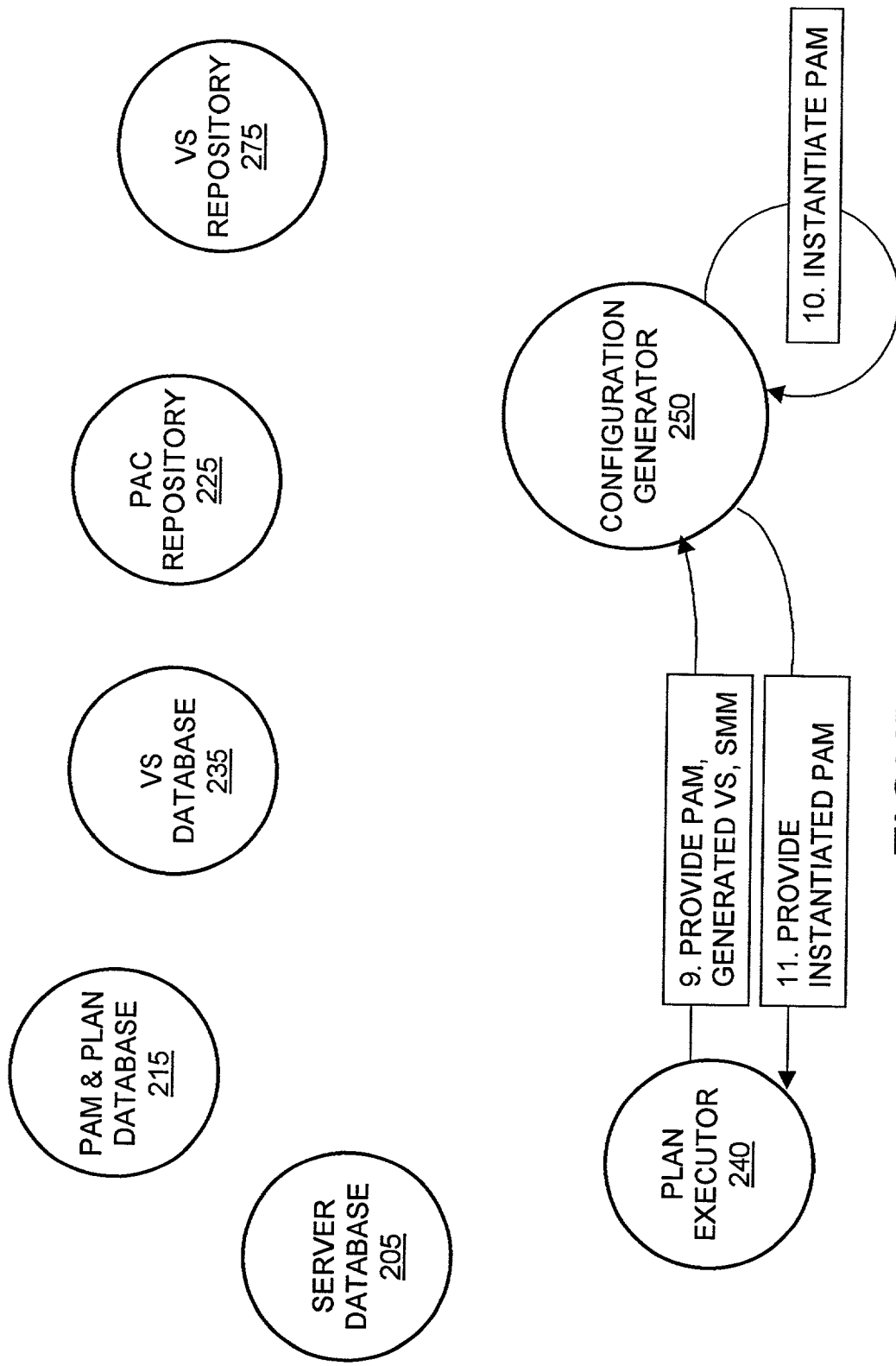
Figure 5C:
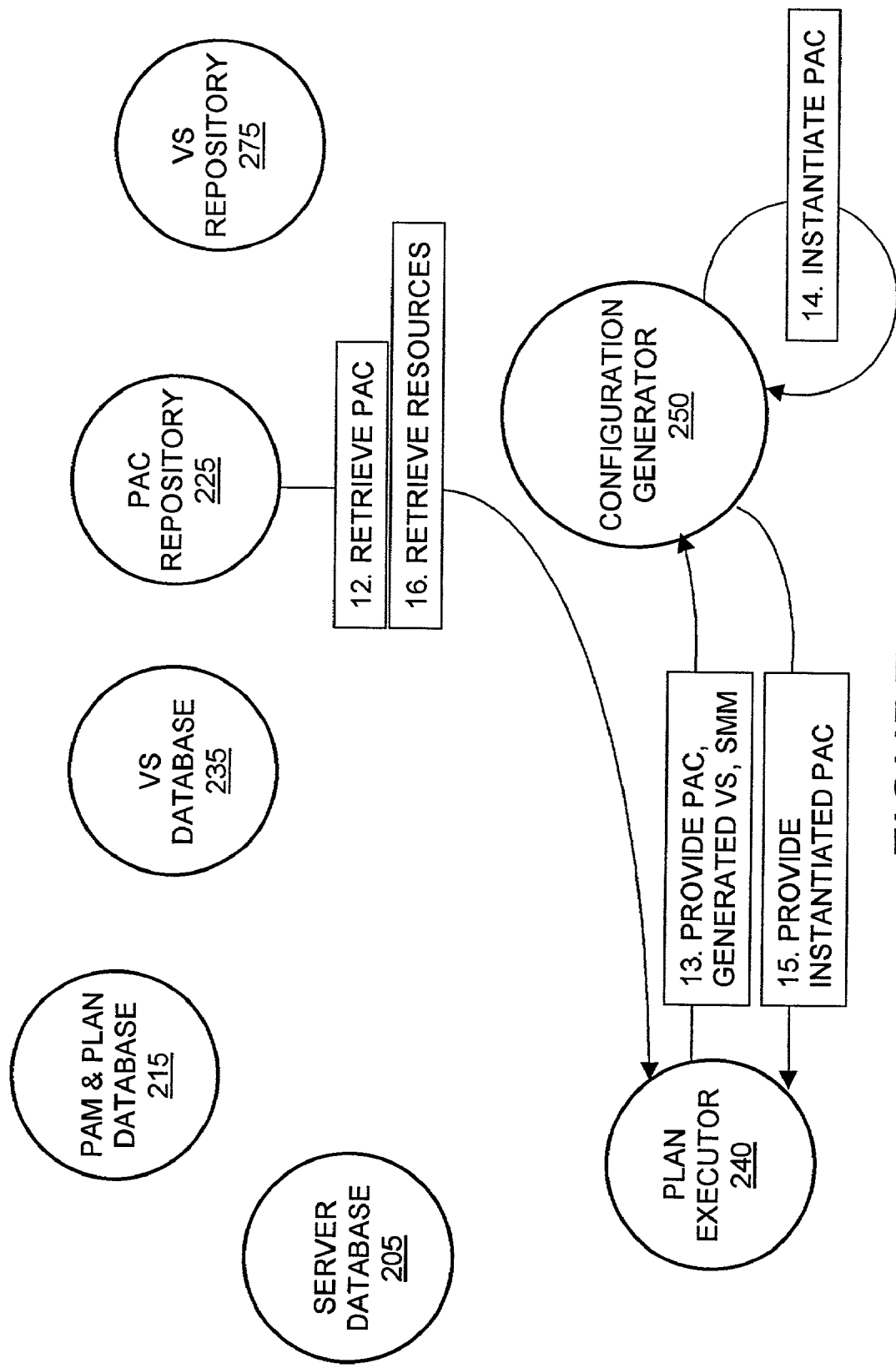

FIGS. 5A, 5B, and 5C illustrate a state diagram for provisioning applications in accordance with the present invention. The entities illustrated are the same as those shown in FIG. 4. The processes are shown in sequential steps as follows.

1. Retrieve Plan. The Plan Executor 240 retrieves a selected Plan 182 from the PAM & Plan Database 215 and creates an object representing the Plan 182 (a plan object).

2. Retrieve PAM. For each PAM 180 referenced in the Plan 182, the Plan Executor 240 retrieves the referenced PAM 180 from the PAM & Plan Database 215 and creates an object representing the PAM 180 (a PAM object). The Plan Executor 240 also creates a plurality of objects, each corresponding to a step in the Plan 182, and referenced by the plan object.

3. Retrieve VS. For each PAM 180 retrieved, the Plan Executor 240 can optionally retrieve a corresponding VS 188 from the VS Database 235. The choice of a particular VS 188 can be based on the target server machine 110 to which an application (represented by a referenced PAM 180) is to be provisioned, and can also be based on a user's selection of a particular environment for running the application (e.g., a production or a staging environment). Alternatively, the VS 188 need not be retrieved. For example, an SMM 186 can contain all the values required for instantiating the variables, thus eliminating the need for the VS 188.

4. Retrieve SMM. For each target server machine 110 to which the application is to be provisioned, the Plan Executor 240 can optionally retrieve a corresponding SMM 186 from the Server Database 205. Alternatively, the SMM 186 need not be retrieved. For example, it may be desired for the values to be retrieved directly from the target server machines 110. In such a case, the Plan Executor 240 can optionally present the values to other modules of the Master Server 170 in the same format as an SMM to ensure compatibility. Of course, in another example, the VS 188 can contain all the values required for instantiating the variables, thereby eliminating the need to retrieve the SMM 186.

5. Retrieve Previous PAM/VS. For each target server machine 110 to which the application is to be provisioned, the Plan Executor 240 can optionally access the VS Repository 275 to retrieve one or more PAMs (and possibly, the associated VSs) of applications already provisioned on the target server machine 110. The state of the already provisioned application(s) can thus form a part of the environmental characteristics.

6. Provide PAM, VS, SMM. For each PAM 180 and each target server machine 110 to which the application is to be provisioned, the Plan Executor 240 provides to the Configuration Generator 250 a set of files, including the PAM 180, VS 188, and SMM 186.

7. Transform VS. For each PAM 180 and each target server machine 110, the Configuration Generator 250 receives a corresponding set of files (PAM 180, VS 188, and SMM 186) and, based thereon, transforms the VS 188 into a Generated VS 270.

8. Store Generated VS. The fully instantiated Generated VS 270 can be stored in a VS Repository 275. In one embodiment, the Configuration Generator 250 stores the Generated VS 270 in the VS Repository 275. In another embodiment, the Configuration Generator 250 passes the Generated VS 270 to the Plan Executor 240, which in turn stores the Generated VS 270 in the VS Repository 275. The Generated VS 270 can be later retrieved from the VS Repository 275 for other uses, such as uninstalling the associated application.

9. Provide PAM, Generated VS, SMM. For each PAM 180 and each target server machine 110, the Plan Executor 240 provides to the Configuration Generator 250 a set of files, including the PAM 180, the corresponding Generated VS 270, and the corresponding SMM 186.

10. Instantiate PAM. The Configuration Generator 250 instantiates the PAM 180 based on the Generated VS 270 and the SMM 186 to produce an Instantiated PAM.

11. Provide Instantiated PAM. Once instantiated, the Instantiated PAM can be provided to the Plan Executor 240.

12. Retrieve PAC. For each PAM 180 and each target server machine 110, the Plan Executor 240 retrieves all the corresponding PACs 180 from the Application & PAC Repository 225.

13. Provide PAC, Generated VS, SMM. For each PAM 180 and each target server machine 110, the Plan Executor 240 provides to the Configuration Generator 250 a set of files, including the PAC(s) 180 associated with the PAM 180, the corresponding Generated VS 270, and the corresponding SMM 186.

14. Instantiate PAC. The Configuration Generator 250 instantiates the PAC(s) 180 based on the Generated VS 270 and the SMM 186 to produce Instantiated PAC file(s).

15. Provide Instantiated PAC. Once instantiated, the Instantiated PAC can be provided to the Plan Executor 240.

16. Retrieve Resources. The Plan Executor 240 collects all the resources of the application from the Application & PAC Repository 225. The resources can then be transferred to the target server machine 110, along with the Instantiated PAC files and the instructions for placing each resource in the target server machine 110.

Figure 6:
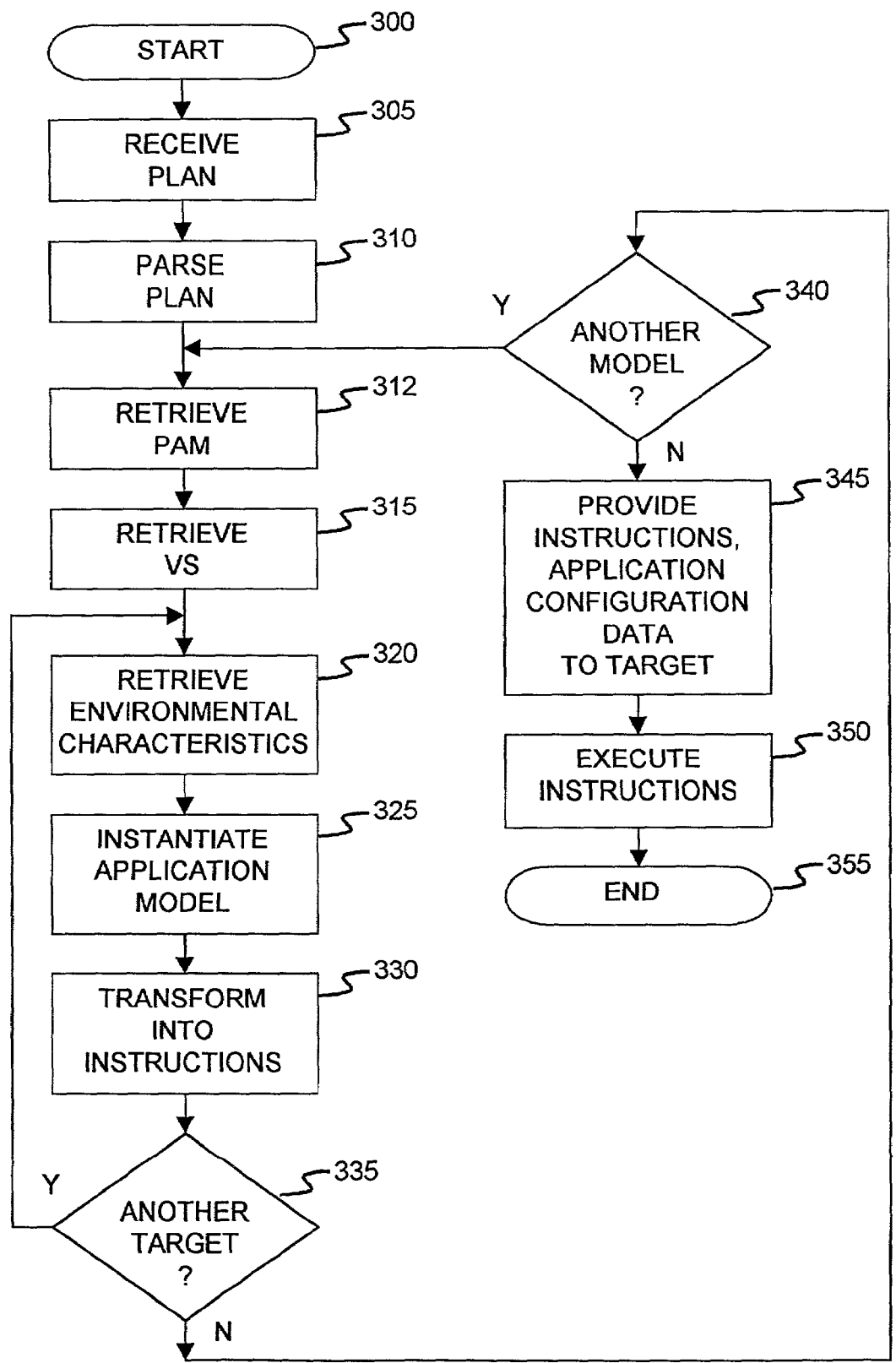
FIG. 6 is a flow diagram illustrating an embodiment of process for provisioning applications in accordance with the present invention.

FIG. 6 illustrates a flow diagram of an embodiment of a process for provisioning applications in accordance with the present invention. The process starts at step 300. In step 305, the process receives a plan to be executed. In step 310, the process parses the plan to determine the application model(s) that are referenced in the plan and the target server machine(s) to which the application(s) are to be provisioned. In step 312, the process retrieves a first application model referenced in the plan. Then, in step 315, the process retrieves a set of variable settings corresponding to the first application model referenced in the plan. In step 320, the process retrieves environmental characteristics corresponding to a first one of the target server machine(s) to which the first application is to be provisioned. Optionally, the process can also retrieve one or more models of applications already provisioned on the target server machine, along with the corresponding set(s) of variable settings. Then, in step 325, the process instantiates the variables in the application model based on the variable settings and the environmental characteristics. In step 330, the process transforms the application model into a set of instructions for provisioning the application onto the target server machine.

Then, in step 335, the process determines whether there are other target server machine(s) remaining to which the application is to be provisioned. If so (Yes in step 335), the process returns to step 320 wherein another set of environmental characteristics corresponding to another target server machine is retrieved. If there are no more target server machines remaining (No in step 335), the process continues to step 340.

In step 340, the process determines whether there are other application models (referenced in the plan) which remain to be processed. If so (Yes in step 340), the process returns to step 312 wherein another application model (referenced in the plan) is retrieved. If there are no other applications remaining (No in step 340), the process continues to step 345. In step 345, the process provides the instructions, along with the application and the configuration data, to the target server machine(s) for execution. In step 350, the instructions are executed on the target server machine(s) to provision the application(s). The process then ends at step 355.

Once an application has been provisioned onto the target server machine 110, circumstances may arise wherein it is desirable to reconfigure the application. For example, due to the discovery of a security hole, a system administrator can be required to reconfigure the application. Similarly, new knowledge (e.g., regarding performance) can lead to changes in the variable settings associated with the application.

Figure 7:
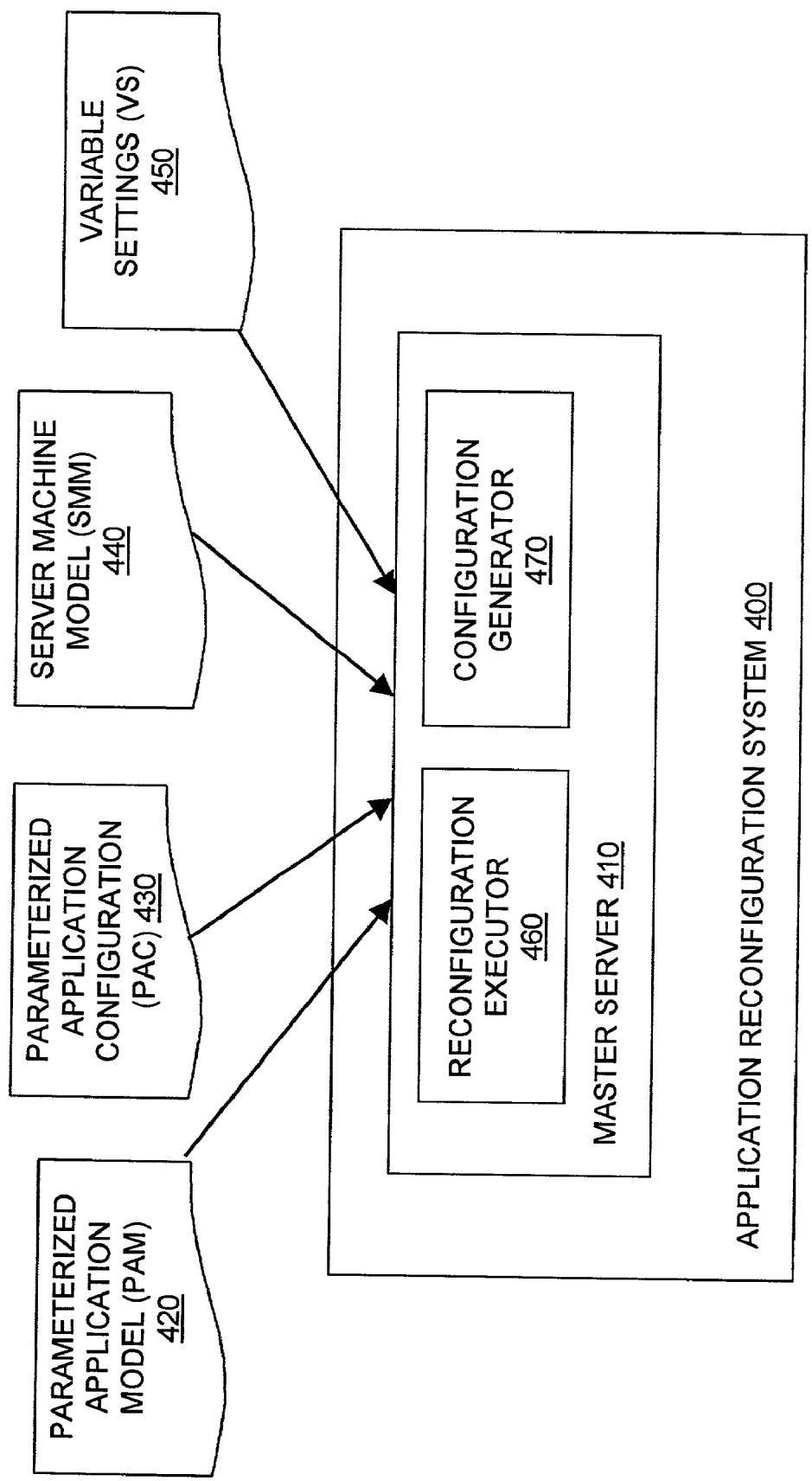
FIG. 7 is a block diagram illustrating an embodiment of an application reconfiguration system in accordance with the present invention.

FIG. 7 illustrates an embodiment of an application reconfiguration system 400 in accordance with the present invention. The application reconfiguration system 400 includes a master server 410 that accepts a plurality of types of input, including, for example, (1) a PAM 420 associated with an application previously provisioned on a managed server machine targeted for reconfiguration; (2) a PAC 430 relating to the application; (3) an SMM 440 of the managed server machine targeted for reconfiguration; and (4) a VS 450 relating to the PAM, which is different from a VS used during the original provisioning of the application.

The master server 410 can include a plurality of modules, which operate to transform inputs received by the application reconfiguration system 400 into an internal data model. In one embodiment, the master server 410 includes a Reconfiguration Executor 460 and a Configuration Generator 470.

The Reconfiguration Executor 460 retrieves a selected PAM 420 and creates an object (in memory) that is a representation of the PAM 420. In an embodiment wherein the PAM 420 is expressed in XML, the object can be, for example, a Java object mirroring the structure of the original XML element. The Reconfiguration Executor 460 receives, as input, a VS file 450 for reconfiguring the application. Alternatively, the Reconfiguration Executor 460 can retrieve the VS 450 (e.g., from the VS Database 235 described above) based on a user selection.

The Reconfiguration Executor 460 can also retrieve an SMM 440 corresponding to each target server machine to be reconfigured. The SMM 440 can, for example, be the same SMM that was used in provisioning the application on to the target server machine. Alternatively, the SMM 440 need not be retrieved. For example, it may be desired for the values to be retrieved directly from the target server machine to be reconfigured. If so, the Reconfiguration Executor 460 can optionally present the values retrieved to other modules of the application reconfiguration system 400 in the format of an SMM. In another example, the VS 450 can contain all the values required for instantiating the variables, thereby eliminating the need to retrieve the SMM 440.

For each target server machine to be reconfigured, the Reconfiguration Executor 460 can optionally access, for example, the VS Repository 275 (described above) to retrieve one or more PAMs (and possibly the associated VSs) of applications already provisioned on the target server machine. The state of the already provisioned application(s) can thus form a part of the environmental characteristics.

For each target server machine containing the application to be reconfigured, the Reconfiguration Executor 460 can call, for example, a Generate_VS function of the Configuration Generator 470. In one embodiment, the Generate_VS function of the Configuration Generator 470 is similar to the Generate_VS function of the Configuration Generator 250 described above with respect to FIGS. 3, 4, 5A, 5B, and 5C. The Reconfiguration Executor 460 can pass, for example, the PAM 420, VS 450 (and optionally any other VSs associated with already provisioned applications), and SMM 440 to the Configuration Generator 470, as inputs to the Generate_VS function. The Configuration Generator 470 then transforms the VS 450 into a Generated VS 455. The fully instantiated Generated VS 455 can be stored in a repository (e.g., the VS repository 275) for later use, such as another reconfiguring or uninstalling the application.

The Reconfiguration Executor 460 can call the Instantiate_PAC function of the Configuration Generator 470, using one or more of the following inputs: (1) all instances of PAC 430 related to the PAM 420, (2) the corresponding Generated VS 455, and/or (3) the corresponding SMM 440. The Configuration Generator 470 instantiates the PAC 430 based on the inputs. In one embodiment, the Instantiate_PAC function of the Configuration Generator 470 is similar to the Instantiate_PAC function of the Configuration Generator 250 described above with respect to FIGS. 3, 4, 5A, 5B, and 5C.

The Reconfiguration Executor 460 then retrieves a Previous Generated VS (e.g., from the VS Repository 275), which corresponds to the most recent provisioning or reconfiguring of the application. The Reconfiguration Executor 460 calls the Instantiate_PAC function of the Configuration Generator 470, using one or more of the following inputs: (1) all instances of PAC 430 related to the PAM 420, (2) the Previous Generated VS (from the previous provisioning), and/or (3) the corresponding SMM 440. The Configuration Generator 470 instantiates a second version of a PAC based on the inputs. The Reconfiguration Executor 460 then marks each configuration file resulting from this function call that differs from the result of the previous call to the Instantiate_PAC function.

The Reconfiguration Executor 460 can call an Instantiate_PAM function of the Configuration Generator 470, using one or more of the following inputs: (1) the PAM 420, (2) the corresponding Generated VS (that was generated by the Configuration Generator 470), and/or (3) the corresponding SMM 440. The Configuration Generator 470 instantiates the PAM 420 based on the inputs. The Instantiate_PAM function of the Configuration Generator 470 is similar to the Instantiate_PAM function of the Configuration Generator 250 described above with respect to FIGS. 3, 4, 5A, 5B, and 5C.

The Reconfiguration Executor 460 can then create one or more plan steps for stopping the application. The plan steps can be taken from the XML element Control of the instantiated PAM 420 and is designed to stop the application. If no such element exists, the Reconfiguration Executor 460 stops and returns an error.

The Configuration Generator 470 creates new Temporary PAM 480, which includes all the marked configuration files. The Configuration Generator 470 then creates a deployResources plan step relating to the Temporary PAM 480, where resource XML attributes are copied from the corresponding resources in the original PAM 420. If necessary, the Configuration Generator 470 also creates one or more plan steps for changing the configurations of the target server machine. The plan steps can be taken from the XML element Control of the instantiated PAM.

The Configuration Generator 470 also creates one or more plan steps for re-starting the application. The plan steps can be taken from the XML element Control of the original instantiated PAM, which is designed to start the application. If no such element exists, the Configuration Generator 470 stops and returns an error.

Once created, the Plan can be executed by a Plan Executor, such as the Plan Executor 240 (described above with respect to FIGS. 3, 4, 5A, 5B, and 5C), to reconfigure the application. After the Plan is executed, the temporary PAM can be discarded.

Figure 8:
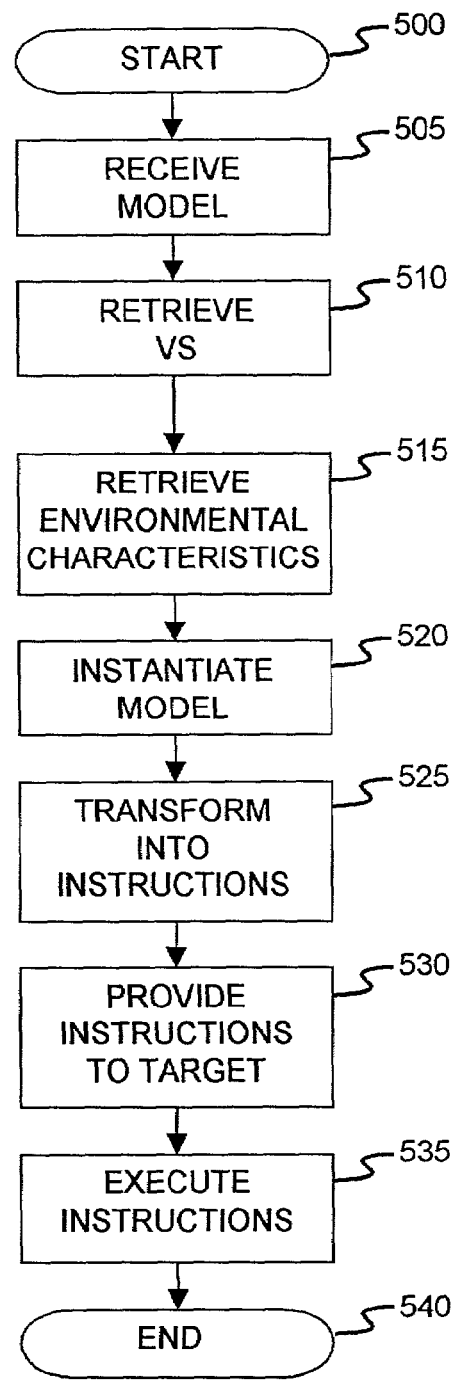
FIG. 8 is a flow diagram illustrating an embodiment of a process for reconfiguring applications in accordance with the present invention.

FIG. 8 illustrates a flow diagram of an embodiment of a process for reconfiguring applications in accordance with the present invention. The process starts at step 500. In step 505, the process receives a model of an application to be reconfigured, along with a reference to a target server machine on which the application is to be reconfigured. In step 510, the process retrieves a set of variable settings corresponding to the application model. In step 515, the process retrieves environmental characteristics corresponding to a first one of the target server machine(s) to which the first application is to be provisioned. Then, in step 520, the process instantiates the variables in the application model based on the variable settings and the environmental characteristics. In step 525, the process transforms the application model into a set of instructions for provisioning the application onto the target server machine. In step 530, the process provides the instructions, along with the application data, to the target server machine(s) for execution. In step 535, the instructions are executed on the target server machine(s) to provision the application(s). The process then ends at step 540.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A method for provisioning an application to a target server machine connected to a master server via a communications network, the method comprising the steps of:

receiving, at said master server, a parameterized application model (PAM) of said application, wherein said PAM is received from a database associated with said master server and comprises:

a variable to be instantiated; and at least one selected from a group consisting a file reference to said application, an action reference for installing said application, a configuration data reference for said application, and a configuration file reference for said application;

receiving, at said master server, parameterized application configuration information associated with said application;

receiving, at said master server, an environmental characteristic corresponding to said variable of said parameterized application model;

creating, at said master server, a data model for said application based on said parameterized application model, said parameterized application configuration information, and said environmental characteristic;

creating, at said master server, a set of instructions based on said data model and executable by said target server machine; and providing said set of instructions from said master server to said target server machine via said communications network, wherein provisioning allows said application to operate without said master server.

2. A method in accordance with claim 1, further comprising the step of storing said parameterized application model, said parameterized application configuration information, and said environmental characteristic in a database associated with said master server.

3. A method in accordance with claim 1, wherein said step of receiving said environmental characteristic comprises the steps of:

receiving, at said master server, a server machine model of said target server machine; and parsing said server machine model to obtain said environmental characteristic.

4. A method in accordance with claim 1, wherein said step of retrieving said environmental characteristic comprises the step of interrogating said target server machine for said environmental characteristic.

5. A method in accordance with claim 1, wherein said step of receiving said environmental characteristic comprises the step of receiving said environmental characteristic from a user via a graphical user interface.

6. A method in accordance with claim 1, wherein said step of retrieving receiving said environmental characteristic comprises the steps of:

receiving, at said master server, variable setting information associated with said variable in said parameterized application model; and parsing said variable setting information to obtain said environmental characteristic.

7. A method in accordance with claim 1, further comprising the steps of retrieving a second parameterized application model of a second application from said database, said second parameterized application model previously used for provisioning said second application to said target server machine; and retrieving a plurality of values associated with said previous provisioning, wherein said data model is further based on said plurality of values.

8. A method in accordance with claim 1, further comprising the step of converting said parameterized application configuration information into a configuration file for configuring said application.

9. A method in accordance with claim 1, wherein said set of instructions are executable by an agent program running on said target server machine.

10. A method in accordance with claim 1, wherein said environmental characteristic is selected from the group consisting of:

a characteristic of said target server machine;

a characteristic of an operating system of said target server machine;

a characteristic of a second application that is provisioned on said target server machine; a user selected characteristic.

11. A method, performable by a first computer, for reconfiguring an application provisioned on a second computer, the method comprising the steps of:

receiving, at said first computer, a parameterized application model for said application, said parameterized application model including at least one variable to be instantiated for describing an environmental characteristic associated with said reconfiguration, wherein said parameterized application model is received from a database associated with said first computer and further includes at least one selected from a group consisting a file reference to said application, an action reference for installing said application, a configuration data reference for said application, and a configuration file reference for said application;

retrieving, from a database associated with said first computer, a first set of configuration data corresponding to a previous configuration of said application on said second computer;

computing, at said first computer, a value for said at least one variable in accordance with said environmental characteristic;

generating, at said first computer and based on said parameterized application model and said value thus computed, a second set of configuration data;

computing, at said first computer, a difference between said first and second sets of configuration data; and generating a sequence of instructions for reconfiguring said application based on said difference, wherein said reconfigured application operates without said first computer.

12. A method in accordance with claim 11, wherein said variable has a corresponding tag, said step of computing said value comprising the steps of:

retrieving said environmental characteristic in accordance with said tag;

generating said value based on said environmental characteristic; and instantiating said variable with said value.

13. A computer-readable storage medium having instructions recorded therein, said instructions executable by a master server for provisioning an application to a target server machine connected to said master server via a communications network, said instructions comprising:

instructions for receiving a parameterized application model (PAM) of said application, wherein said PAM is received from a database associated with said master server and comprises:

a variable to be instantiated; and at least one selected from a group consisting a file reference to said application, an action reference for installing said application, a configuration data reference for said application, and a configuration file reference for said application;

instructions for receiving parameterized application configuration information associated with said application;

instructions for receiving an environmental characteristic corresponding to said variable in said parameterized application model;

instructions for creating a data model for said application based on said parameterized application model, said parameterized application configuration information, and said environmental characteristic;

instructions for creating a set of instructions based on said data model and executable by said target server machine; and instructions for providing said set of instructions from said master server to said target server machine via said communications network, wherein provisioning allows said application to operate without said master server.

14. A computer-readable storage medium in accordance with claim 13, wherein said instructions further comprise:

instructions for parsing a server machine model of said target server machine to obtain said environmental characteristic;

instructions for interrogating said target server machine for said environmental characteristic;

instructions for receiving said environmental characteristic from a user via a graphical user interface; and instructions for parsing variable setting information associated with at least one variable in said parameterized application model to obtain said environmental characteristic.

15. A computer-readable storage medium in accordance with claim 13, wherein said instructions further comprise:
instructions for retrieving a second parameterized application model of a second application from said database associated with said master server, said second parameterized application model previously used for provisioning said second application to said target server machine; and instructions for retrieving a plurality of values associated with said previous provisioning, wherein said data model is further based on said plurality of values.

16. A computer-readable storage medium in accordance with claim 13, wherein said environmental characteristic is selected from the group consisting of:

a characteristic of said target server machine;

a characteristic of an operating system of said target server machine;

a characteristic of a second application that is provisioned on said target server machine;

a user selected characteristic.

17. A computer-readable storage2e medium having instructions recorded therein, said instructions executable by a first computer to reconfigure an application provisioned on a second computer, said instructions comprising:

instructions for receiving a parameterized application model for said application, said parameterized application model including at least one variable to be instantiated for describing an environmental characteristic associated with said reconfiguration, wherein said parameterized application model is received from a database associated with said master server and comprises at least one selected from a group consisting a file reference to said application, an action reference for installing said application, a configuration data reference for said application, and a configuration file reference for said application;

instructions for retrieving, from a database associated with said first computer, a first set of configuration data corresponding to a previous configuration of said application on said second computer;

instructions for computing a value for said at least one variable in accordance with said environmental characteristic;

instructions for generating, based on said parameterized application model and said value thus computed, a second set of configuration data;

instructions for computing a difference between said first and second sets of configuration data; and instructions for generating a sequence of instructions for reconfiguring said application based on said difference, wherein said reconfigured application operates without said first computer.

18. An application provisioning system for provisioning an application to a target server machine, comprising:

a master server, connected to said target server machine via a communications network, said master server including:

a plan executor for receiving a parameterized application model (PAM) of said application, parameterized application configuration information associated with said application, and an environmental characteristic corresponding to a variable to be instantiated of said parameterized application model; and a configuration generator for computing a value for said at least one variable in accordance with said environmental characteristic, said plan executor creating a data model for said application, and creating a set of instructions based on said data model and executable by said target server machine;

wherein said data model is based on said parameterized application model, said parameterized application configuration information, and said value; and wherein said master server is adapted for providing said set of instructions to said target server machine via said communications network, wherein provisioning allows said application to operate without said master server, wherein said PAM is received from a database associated with said master server and comprises at least one selected from a group consisting a file reference to said application, an action reference for installing said application, a configuration data reference for said application, and a configuration file reference for said application.

19. An application provisioning system in accordance with claim 18, wherein said master server comprises a database for storing said parameterized application model, said parameterized application configuration information, and said environmental characteristic.

20. An application provisioning system in accordance with claim 18, wherein said master server further comprises:

a server database for storing a server machine model of said target server machine; and a server machine model parser for parsing said server machine model to obtain said environmental characteristic.

21. An application provisioning system in accordance with claim 18, wherein said master server interrogates said target server machine for said environmental characteristic.

22. An application provisioning system in accordance with claim 18, wherein said master server receives said environmental characteristic from a user via a graphical user interface.

23. An application provisioning system in accordance with claim 18, wherein said master server comprises:

a variable settings database for storing variable setting information associated with said variable in said parameterized application model; and a variable settings parser for parsing said variable setting information to obtain said environmental characteristic.

24. An application provisioning system in accordance with claim 18, wherein said plan executor is adapted to retrieve:
  a second parameterized application model of a second application from said database associated with said master server, said second parameterized application model previously used for provisioning said second application to said target server machine, and
  a plurality of values associated with said previous provisioning, and wherein said data model is further based on said plurality of values.

25. An application provisioning system in accordance with claim 18, wherein said master server converts said parameterized configuration information into a configuration file for configuring said application.

26. An application provisioning system in accordance with claim 18, further comprising an agent program, operable on said target server machine and adapted for executing said set of instructions.

27. An application provisioning system in accordance with claim 18, wherein said environmental characteristic is selected from the group consisting of:
  a characteristic of said target server machine;
  a characteristic of an operating system of said target server machine;
  a characteristic of a second application that is provisioned on said target server machine;
  a user selected characteristic.

28. An application provisioning system for provisioning an application onto a plurality of target server machines, comprising:
  a master server, connected to said plurality of target server machines via a communications network, said master server including:
    a plan executor for receiving a parameterized application model of said application, said parameterized application model containing a variable to be instantiated for describing an environmental characteristic associated with said plurality of target server machines; and
    a configuration generator for computing a corresponding value for said variable for each of said plurality of target server machines, said plan executor generating corresponding configuration data for each of said plurality of target server machines based on said value, and creating a corresponding sequence of instructions for each of said plurality of target server machines in accordance with said corresponding configuration data; and
  a plurality of agent programs for executing, at each corresponding one of said plurality of target server machines, said corresponding sequence of instructions to provision said application onto said target server machine,
  wherein provisioning allows said application to operate without said master servers
  wherein said parameterized application model is received from a database associated with said master server and comprises at least one selected from a group consisting a file reference to said application, an action reference for installing said application, a configuration data reference for said application, and a configuration file reference for said application.

29. An application provisioning system in accordance with claim 28, wherein said environmental characteristic is selected from the group consisting of:
  a characteristic of said target server machine;
  a characteristic of an operating system of said target server machine;
  a characteristic of a second application that is provisioned on said target server machine;
  a user selected characteristic.

30. An application provisioning system in accordance with claim 28, wherein said application includes a configuration file, said master server generating a plurality of configuration files corresponding to said plurality of target server machines based on said corresponding configuration data for each of said plurality of target server machines,
  wherein said corresponding sequence of instructions includes instructions for providing a corresponding one of said plurality of configuration files to each of said plurality of target server machines.

31. An application reconfiguration system for reconfiguring an application provisioned on a target server machine, comprising:
  a master server, connected to said target server machine via a communications network, said master server including:
    a reconfiguration executor for receiving a parameterized application model for said application, said parameterized application model including at least one variable to be instantiated for describing an environmental characteristic associated with said reconfiguration, and retrieving, from a database associated with said first computer, a first set of configuration data corresponding to a previous configuration of said application on said second computer; and
    a configuration generator for computing a value for said at least one variable in accordance with said environmental characteristic, and generating a second set of configuration data based on said model and said value thus computed;
  said reconfiguration executor computing a difference between said first and second sets of configuration data and generating a sequence of instructions for reconfiguring said application based on said difference,
  wherein said reconfigured application operates without said master server,
  wherein said parameterized application model is received from a database associated with said master server and comprises at least one selected from a group consisting a file reference to said application, an action reference for installing said application, a configuration data reference for said application, and a configuration file reference for said application.

* * * * *